United States Patent
Quirk

(10) Patent No.: US 12,447,514 B2
(45) Date of Patent: Oct. 21, 2025

(54) OPTIMIZATION OF A THERMOPHILIC PHB DEPOLYMERASE FOR INDUSTRIAL APPLICATIONS

(71) Applicant: Kimberly-Clark Worldwide, Inc., Neenah, WI (US)

(72) Inventor: Stephen Quirk, Alpharetta, GA (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 18/558,849

(22) PCT Filed: May 28, 2021

(86) PCT No.: PCT/US2021/034879
§ 371 (c)(1),
(2) Date: Nov. 3, 2023

(87) PCT Pub. No.: WO2022/250695
PCT Pub. Date: Dec. 1, 2022

(65) Prior Publication Data
US 2024/0226974 A1    Jul. 11, 2024

(51) Int. Cl.
B09B 3/60      (2022.01)
B09B 101/67    (2022.01)
B09B 101/75    (2022.01)
C12N 9/18      (2006.01)

(52) U.S. Cl.
CPC ............ B09B 3/60 (2022.01); C12N 9/18 (2013.01); C12Y 301/01075 (2013.01); B09B 2101/67 (2022.01); B09B 2101/75 (2022.01)

(58) Field of Classification Search
CPC ... B09B 3/60; B09B 2101/67; B09B 2101/75; C12N 9/18; C12Y 301/01075; C08J 11/105
See application file for complete search history.

(56) References Cited

U.S. PATENT DOCUMENTS

| | | |
|---|---|---|
| 5,968,801 A | 10/1999 | Saito et al. |
| 7,858,353 B2 | 12/2010 | Thompson et al. |
| 8,728,776 B2 | 5/2014 | Ferreira et al. |
| 9,783,833 B2 | 10/2017 | Pearlman et al. |
| 2003/0143703 A1 | 7/2003 | Lee et al. |
| 2012/0171743 A1 | 7/2012 | Hoang et al. |
| 2017/0313998 A1* | 11/2017 | Alvarez ............... C12P 7/56 |

FOREIGN PATENT DOCUMENTS

| | | |
|---|---|---|
| JP | H09191887 A | 7/1997 |
| JP | 2006238801 A | 9/2006 |
| JP | 2009207424 A | 9/2009 |
| KR | 100429001 B1 | 4/2004 |
| KR | 101118695 B1 | 3/2012 |
| WO | WO2016146540 A1 | 9/2016 |

OTHER PUBLICATIONS

Roohi et al. PHB(poly-beta-hydroxybutyrate) and its enzymatic degradation. 2018. Polymers Advanced Technologies. 29:30-40 (Year: 2018).*
Singh RK et al. Protein Engineering and Approaches in the Post-Genomic Era. 2017. Current Protein and Peptide Science. 18, 1-11 . (Year: 2017).*
Zhang M et al. Propagated Perturbations from a Peripheral Mutation Shows Interactions Supporting WW Domain Thermostability. 2018, Structure 26, 1474-1485. (Year: 2018).*
Atanasova et al., Plastic Degradation by Extremophilic Bacteria, International Journal of Molecular Sciences, vol. 22, 5610, 2021, 19 Pages, https://doi.org/10.3390/ijms22115610.
PCT Search Report Corresponding to Application No. PCT/US2021/034879 on Aug. 5, 2021.
García-Hidalgo et al., Novel Extracellular PHB Depolymerase from Streptomyces ascomycinicus: PHB Copolymers Degradation in Acidic Conditions, PLOS One, vol. 8, Issue 8, 2013, pp. 1-13, https://doi.org/10.1371/journal.pone.0071699.
Hiraishi et al., Effects of Mutations in the Substrate-Binding Domain of Poly [(R)-3-Hydroxybutyrate] (PHB) Depolymerase from Ralstonia pickettii T1 on PHB Degradation, Applied and Environmental Microbiology, vol. 72, Issue 11, 2006, pp. 7331-7338, https://doi.org/10.1128/ABM.01187-06.
Hiraishi et al., Protein Engineering of Enzymes Involved in Bioplastic Metabolism, Protein Engineering—Technology and Application, Chapter 6, 2013, pp. 133-165, DOI: 10.5772/55552.
Hiraishi et al., Y443F mutation in the substrate-binding domain of extracellular PHB depolymerase enhances its PHB adsorption and disruption abilities, Polymer Degradation and Stability, vol. 95, Issue 8, 2010, Abstract Only, https://doi.org/10.1016/j.polymdegradstab.2010.01.022.

(Continued)

Primary Examiner — Paul J Holland
(74) Attorney, Agent, or Firm — Dority & Manning, P.A.

(57) ABSTRACT

The present invention relates to a method for treatment of polyhydroxyalkanoate (PHA) containing post-consumer product, the method comprising contacting a post-consumer product with a polypeptide that can catalyze degradation of the PHA, the contact taking place at a temperature at least 45° C. In a specific embodiment, the poly peptide is a wild-type PHA depolymerase expressed by a thermophilic microorganism or a modified PHA depolymerase that includes one or more single-site mutations as compared to the wild-type PHA depolymerase. In another specific embodiment, the polypeptide comprising a modified poly hydroxy butyrate (PHB) depolymerase comprising one or more single-site mutations as compared to SEQ ID NO: 1, and the modified PHB depolymerase having an optimum temperature of at least 45° C. The present invention also relates to a host cell transformed to express a polypeptide that catalyzes degradation of a PHA, the polypeptide having an optimum temperature for the degradation reaction of at least 45° C., wherein the host cell is selected from an *E. coli* cell or a thermophilic microorganism.

6 Claims, 7 Drawing Sheets
Specification includes a Sequence Listing.

(56) References Cited

OTHER PUBLICATIONS

Shin et al., Enhancement of PHB depolymerase Activity from Alcaligenes faecalis T1 by DNA Shuffling, Korea Agricultural Science Digital Library, vol. 39, Issue 2, 2003, Abstract Only.

EP Search Report for Application 21943276.2 mailed on Apr. 14, 2025, 17 pages.

Calabia et al., Microbial degradation of poly(d-3-hydroxybutyrate) by a new thermophilic Streptomyces isolate, Biotechnology Letters, vol. 26, No. 1, 2004, pp. 15-19, https://doi.org/10.1023/B:BILE.0000009453.81444.51.

Hideki et al., Enzymatic and Environmental Degradation of Racemic Poly(3-hydroxybutyric acid)s with Different Stereoregularities, Macromolecules, vol. 29, Issue 27, 1996, pp. 8683-8688, https://doi.org/10.1021/ma960907a.

Reddy et al., Polyhydroxyalkanoates: an overview, Bioresource Technology, vol. 87, 2003, pp. 137-146, https://doi.org/10.1016/80960-8524(02)00212-2.

Roohi et al., Microbial Enzymatic Degradation of Biodegradable Plastics, Current Pharmaceutical Biotechnology, 18(5), 2017, pp. 429-440, https://doi.org/10.2174/1389201018666170523165742.

Shah et al., Biological degradation of plastics: A comprehensive review, Biotechnology Advances, vol. 26, 2008, pp. 246-265, https://doi.org/10.1016/j.biotechady.2007.12.005.

Thomas et al., Bioplastic degradation by a polyhydroxybutyrate depolymerase from a thermophilic soil bacterium, Protein Science, 2022, 11 Pages, https:/doi.org/10.1002/pro.4470.

* cited by examiner

SEQUENCE LISTING

<160> NUMBER OF SEQ ID NOS: 18

<210> SEQ ID NO 1
<211> LENGTH: 322
<212> TYPE: PRT
<213> ORGANISM: Lihuaxuella thermophila

```
<400> SEQUENCE: 1

Met Phe Leu Leu Ala Leu Val Thr Ser Leu Ile Gly Thr Gly Met Phe
1               5                   10                  15

Thr Thr Pro Val His Ala Ala Gly Gln Phe Ile Arg Asp Thr Ala Pro
            20                  25                  30

Asp Gly Arg Val Tyr Lys Leu Tyr Ile Pro Ser Gly Tyr Asn Gly Ser
        35                  40                  45

Thr Pro Leu Pro Leu Val Val Met Leu His Gly Cys Thr Gln Asn Pro
    50                  55                  60

Asp Asp Phe Ala Ala Gly Thr Glu Met Asn Val Tyr Ala Glu Gln Asn
65                  70                  75                  80

Asn Phe Leu Val Ala Tyr Pro Glu Gln Pro Ser Ser Ala Asn Leu Asn
                85                  90                  95

Lys Cys Trp Asn Trp Phe Asp Ser Asn His Gln Ser Arg Gly Arg Gly
            100                 105                 110

Glu Pro Ala Ser Ile Ala Gly Val Val Glu Asp Val Lys Arg Asn Tyr
        115                 120                 125

Ser Val Asp Ser Arg Arg Val Tyr Ala Ala Gly Leu Ser Ala Gly Gly
    130                 135                 140

Ala Met Ser Val Ile Met Gly Ala Thr Tyr Pro Asp Val Phe Ala Ala
145                 150                 155                 160

Ile Gly Val Gly Ser Gly Leu Glu Tyr Lys Ala Ala Thr Ser Met Thr
                165                 170                 175

Ser Ala Tyr Met Ala Met Ile Asn Gly Gly Pro Asp Pro Val Gln Gln
            180                 185                 190

Gly Asn Leu Ala Tyr Gln Ala Met Gly Ser His Ala Arg Val Val Pro
        195                 200                 205

Val Ile Val Phe His Gly Thr Ser Asp Tyr Thr Val Tyr Pro Val Asn
    210                 215                 220

Gly His Gln Val Ile Ser Gln Trp Ala Gln Thr Asn Asp Arg Ala Gly
225                 230                 235                 240

Asp Gly Val Asp Asn Asn His Ile Asp Asp Gln Ala Asp Val Thr Met
                245                 250                 255

Asn Gly Ser Val Pro Asn Gly Arg Thr Tyr Thr Arg Tyr Leu Tyr Lys
            260                 265                 270

Asp Gln Asn Gly Asn Val Val Met Glu Lys Ile Met Val Asn Gly Met
        275                 280                 285

Gly His Ala Trp Ser Gly Gly Ser Thr Ala Gly Thr Tyr Thr Asp Pro
    290                 295                 300

Ala Gly Pro Glu Ala Ser Ser Met Met Trp Ser Phe Phe Val Asn His
305                 310                 315                 320

Pro Lys

<210> SEQ ID NO 2
<211> LENGTH: 9
<212> TYPE: PRT
<213> ORGANISM: Lihuaxuella thermophila

<400> SEQUENCE: 2

Val Val Met Leu His Gly Cys Thr Gln
1               5

<210> SEQ ID NO 3
<211> LENGTH: 7
<212> TYPE: PRT
```

<213> ORGANISM: Lihuaxuella thermophila

<400> SEQUENCE: 3

Thr Ser Ala Tyr Met Ala Met
1               5

<210> SEQ ID NO 4
<211> LENGTH: 6
<212> TYPE: PRT
<213> ORGANISM: Lihuaxuella thermophila

<400> SEQUENCE: 4

Gly Arg Thr Tyr Thr Arg
1               5

<210> SEQ ID NO 5
<211> LENGTH: 5
<212> TYPE: PRT
<213> ORGANISM: Lihuaxuella thermophila

<400> SEQUENCE: 5

Met Gly His Ala Trp
1               5

<210> SEQ ID NO 6
<211> LENGTH: 299
<212> TYPE: PRT
<213> ORGANISM: Lihuaxuella thermophila

<400> SEQUENCE: 6

Gly Gln Phe Ile Arg Asp Thr Ala Pro Asp Gly Arg Val Tyr Lys Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
        35                  40                  45

Glu Met Asn Val Tyr Ala Glu Gln Asn Asn Phe Leu Val Ala Tyr Pro
    50                  55                  60

Glu Gln Pro Ser Ser Ala Asn Leu Asn Lys Cys Trp Asn Trp Phe Asp
65                  70                  75                  80

Ser Asn His Gln Ser Arg Gly Arg Gly Glu Pro Ala Ser Ile Ala Gly
                85                  90                  95

Val Val Glu Asp Val Lys Arg Asn Tyr Ser Val Asp Ser Arg Arg Val
            100                 105                 110

Tyr Ala Ala Gly Leu Ser Ala Gly Gly Ala Met Ser Val Ile Met Gly
        115                 120                 125

Ala Thr Tyr Pro Asp Val Phe Ala Ala Ile Gly Val Gly Ser Gly Leu
    130                 135                 140

Glu Tyr Lys Ala Ala Thr Ser Met Thr Ser Ala Tyr Met Ala Met Ile
145                 150                 155                 160

Asn Gly Gly Pro Asp Pro Val Gln Gln Gly Asn Leu Ala Tyr Gln Ala
                165                 170                 175

Met Gly Ser His Ala Arg Val Val Pro Val Ile Val Phe His Gly Thr
            180                 185                 190

Ser Asp Tyr Thr Val Tyr Pro Val Asn Gly His Gln Val Ile Ser Gln
        195                 200                 205

Trp Ala Gln Thr Asn Asp Arg Ala Gly Asp Gly Val Asp Asn Asn His
    210                 215                 220

Ile Asp Asp Gln Ala Asp Val Thr Met Asn Gly Ser Val Pro Asn Gly
225                 230                 235                 240

Arg Thr Tyr Thr Arg Tyr Leu Tyr Lys Asp Gln Asn Gly Asn Val Val
            245                 250                 255

Met Glu Lys Ile Met Val Asn Gly Met Gly His Ala Trp Ser Gly Gly
        260                 265                 270

Ser Thr Ala Gly Thr Tyr Thr Asp Pro Ala Gly Pro Glu Ala Ser Ser
        275                 280                 285

Met Met Trp Ser Phe Phe Val Asn His Pro Lys
        290                 295

<210> SEQ ID NO 7
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 7

Gly Gln Phe Ile Arg Asp Thr Ala Pro Leu Gly Arg Val Tyr Phe Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
        35                  40                  45

Leu Met Asn Val Tyr Ala Glu Gln Asn Asn Phe Leu Val Ala Tyr Pro
50                  55                  60

Glu Gln Leu Ser Ser Ala Asn Leu Asn Lys Cys Trp Asn Trp Phe Asp
65                  70                  75                  80

Ser Asn His Gln Ser Arg Gly Arg Gly Glu Pro Ala Ser Ile Ala Gly
            85                  90                  95

Met Val Glu Leu Val Phe Arg Asn Tyr Ser Val Asp Ser Arg Arg Val
        100                 105                 110

Tyr Leu Ala Gly Leu Ser Ala Gly Gly Ala Met Ile Leu Ile Met Leu
    115                 120                 125

Ala Thr Tyr Pro Asp Val Phe Ala Ala Ile Phe Val Gly Ser Gly Leu
130                 135                 140

Pro Tyr Lys Leu Ala Thr Ser Met Thr Ser Ala Tyr Met Ala Met Ile
145                 150                 155                 160

Asn Gly Gly Pro Asp Pro Val Gln Gln Gly Asn Leu Ala Tyr Gln Ala
            165                 170                 175

Met Gly Ser His Ala Arg Val Val Pro Val Ile Val Phe His Gly Thr
        180                 185                 190

Ser Asp Tyr Thr Val Tyr Glu Val Asn Gly His Gln Val Ile Ser Gln
    195                 200                 205

Trp Ala Gln Thr Asn Asp Arg Ala Gly Asp Gly Val Asp Asn Asn His
210                 215                 220

Ile Asp Asp Gln Ala Asp Val Thr Met Asn Gly Ser Val Glu Asn Gly
225                 230                 235                 240

Arg Thr Tyr Thr Arg Tyr Leu Tyr Lys Asp Gln Asn Gly Asn Val Val
            245                 250                 255

Met Glu Lys Ile Met Val Asn Gly Met Gly His Ala Trp Ser Gly Gly
        260                 265                 270

Ser Thr Ala Gly Thr Tyr Thr Asp Pro Ala Gly Glu Glu Ala Ser Ser
        275                 280                 285

```
Met Met Trp Ser Phe Phe Val Asn His Glu Lys
    290                 295

<210> SEQ ID NO 8
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 8

Gly Gln Val Ile Arg Asp Thr Ala Pro Asp Gly Arg Val Tyr Lys Leu
1               5                   10                  15

Tyr Ile Pro Ser Gly Tyr Asn Gly Ser Thr Pro Leu Pro Leu Val Val
                20                  25                  30

Val Leu His Gly Cys Thr Gln Asn Trp Asp Asp Ile Ala Ala Gly Thr
            35                  40                  45

Glu Leu Asn Val Tyr Ala Glu Gln Asn Asn Phe Leu Val Ala Tyr Pro
        50                  55                  60

Glu Gln Pro Ser Ser Ala Asn Leu Asn Lys Cys Trp Asn Leu Phe Asp
65                  70                  75                  80

Ser Asn His Gln Ser Arg Gly Arg Gly Glu Leu Pro Ser Ile Ala Gly
                85                  90                  95

Val Val Glu Asp Val Lys Arg Asn Tyr Ser Val Asp Ser Arg Arg Val
            100                 105                 110

Tyr Val Ala Gly Leu Ser Ala Gly Gly Ile Leu Ser Val Ile Leu Gly
            115                 120                 125

Leu Thr Tyr Pro Asp Val Leu Ala Ala Ile Gly Val Gly Ser Gly Trp
    130                 135                 140

Glu Tyr Lys Ala Ala Thr Ser Trp Thr Ser Ala Tyr Leu Ala Leu Gly
145                 150                 155                 160

Asn Gly Gly Pro Asp Pro Pro Gln Gln Gly Asn Leu Ala Tyr Gln Ala
                165                 170                 175

Met Gly Ser His Ala Arg Val Pro Pro Val Ile Val Trp His Gly Thr
            180                 185                 190

Ser Asp Tyr Thr Val Tyr Pro Pro Asn Gly His Gln Val Leu Ser Gln
        195                 200                 205

Ile Ala Gln Thr Asn Asp Arg Ala Gly Asp Val Asp Asn Asn His
    210                 215                 220

Ile Asp Asp Gln Ala Asp Val Thr Ile Asn Gly Ser Val Pro Asn Gly
225                 230                 235                 240

Arg Thr Tyr Thr Arg Tyr Leu Tyr Lys Asp Gln Asn Gly Asn Val Val
                245                 250                 255

Met Glu Lys Ile Leu Val Asn Gly Met Gly His Ala Val Ser Gly Gly
            260                 265                 270

Ser Thr Gly Gly Thr Tyr Thr Asp Pro Ala Gly Pro Glu Ala Ser Ser
        275                 280                 285

Met Met Trp Ser Phe Phe Val Asn His Pro Lys
    290                 295

<210> SEQ ID NO 9
<211> LENGTH: 16
<212> TYPE: PRT
<213> ORGANISM: Artificial Sequence
<220> FEATURE:
<223> OTHER INFORMATION: Description of Artificial Sequence: Synthetic
``` peptide

<400> SEQUENCE: 9

Met His His His His His His Gly Ser Glu Asn Leu Tyr Phe Gln Ser
1               5                   10                  15

<210> SEQ ID NO 10
<211> LENGTH: 5
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 10

Ser Ala Gly Gln Phe
1               5

<210> SEQ ID NO 11
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (10)..(10)
<223> OTHER INFORMATION: L or F
<220> FEATURE:
<221> NAME/KEY: MOD_RES
<222> LOCATION: (15)..(15)
<223> OTHER INFORMATION: F, L or W
<220> FEATURE:
<221> NAME/KEY: MOD_RES
<222> LOCATION: (49)..(49)
<223> OTHER INFORMATION: L, I, V or F
<220> FEATURE:
<221> NAME/KEY: MOD_RES
<222> LOCATION: (62)..(62)
<223> OTHER INFORMATION: L, W, Y, I, F, M, V or C
<220> FEATURE:
<221> NAME/KEY: MOD_RES
<222> LOCATION: (93)..(93)
<223> OTHER INFORMATION: I or L
<220> FEATURE:
<221> NAME/KEY: MOD_RES
<222> LOCATION: (100)..(100)
<223> OTHER INFORMATION: L or F
<220> FEATURE:
<221> NAME/KEY: MOD_RES
<222> LOCATION: (102)..(102)
<223> OTHER INFORMATION: M, F or L
<220> FEATURE:
<221> NAME/KEY: MOD_RES
<222> LOCATION: (114)..(114)
<223> OTHER INFORMATION: L, I, F, Y, V or M
<220> FEATURE:
<221> NAME/KEY: MOD_RES
<222> LOCATION: (124)..(124)
<223> OTHER INFORMATION: I, L, T, A, F, M or V
<220> FEATURE:
<221> NAME/KEY: MOD_RES
<222> LOCATION: (128)..(128)
<223> OTHER INFORMATION: L, F, I, W, A, M, V, E, T, C, Y or N
<220> FEATURE:
<221> NAME/KEY: MOD_RES
<222> LOCATION: (139)..(139)
<223> OTHER INFORMATION: W, F, Y, L, I or P
<220> FEATURE:
<221> NAME/KEY: MOD_RES
<222> LOCATION: (148)..(148)
<223> OTHER INFORMATION: L, C or F
<220> FEATURE:
<221> NAME/KEY: MOD_RES

```
<222> LOCATION: (169)..(169)
<223> OTHER INFORMATION: L, W or I
<220> FEATURE:
<221> NAME/KEY: MOD_RES
<222> LOCATION: (202)..(202)
<223> OTHER INFORMATION: L, F, I, V, M or W

<400> SEQUENCE: 11
```

Gly Gln Phe Ile Arg Asp Thr Ala Pro Xaa Gly Arg Val Tyr Xaa Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
        35                  40                  45

Xaa Met Asn Val Tyr Ala Glu Gln Asn Asn Phe Leu Val Xaa Tyr Pro
    50                  55                  60

Glu Gln Pro Ser Ser Ala Asn Leu Asn Lys Cys Trp Asn Trp Phe Asp
65                  70                  75                  80

Ser Asn His Gln Ser Arg Gly Arg Gly Glu Pro Ala Xaa Ile Ala Gly
                85                  90                  95

Met Val Glu Xaa Val Xaa Arg Asn Tyr Ser Val Asp Ser Arg Arg Val
            100                 105                 110

Tyr Xaa Ala Gly Leu Ser Ala Gly Gly Ala Met Xaa Val Ile Met Xaa
        115                 120                 125

Ala Thr Tyr Pro Asp Val Phe Ala Ala Ile Xaa Val Gly Ser Gly Leu
    130                 135                 140

Pro Tyr Lys Xaa Ala Thr Ser Met Thr Ser Ala Tyr Met Ala Met Ile
145                 150                 155                 160

Asn Gly Gly Pro Asp Pro Val Gln Xaa Gly Asn Leu Ala Tyr Gln Ala
                165                 170                 175

Met Gly Ser His Ala Arg Val Val Pro Val Ile Val Phe His Gly Thr
            180                 185                 190

Ser Asp Tyr Thr Val Tyr Pro Val Asn Xaa His Gln Val Ile Ser Gln
        195                 200                 205

Trp Ala Gln Thr Asn Asp Arg Ala Gly Asp Gly Val Asp Asn Asn His
    210                 215                 220

Ile Asp Asp Gln Ala Asp Val Thr Met Asn Gly Ser Val Pro Asn Gly
225                 230                 235                 240

Arg Thr Tyr Thr Arg Tyr Leu Tyr Lys Asp Gln Asn Gly Asn Val Val
                245                 250                 255

Met Glu Leu Trp Met Val Asn Gly Met Gly His Ala Trp Ser Gly Gly
            260                 265                 270

Ser Thr Ala Gly Thr Tyr Thr Asp Pro Ala Gly Pro Glu Ala Ser Ser
        275                 280                 285

Met Met Trp Ser Phe Phe Val Asn His Pro Lys
    290                 295

```
<210> SEQ ID NO 12
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide

<400> SEQUENCE: 12
```

Gly Gln Phe Ile Arg Asp Thr Ala Pro Leu Gly Arg Val Tyr Phe Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
            35                  40                  45

Leu Met Asn Val Tyr Ala Glu Gln Asn Asn Phe Leu Val Leu Tyr Pro
        50                  55                  60

Glu Gln Pro Ser Ser Ala Asn Leu Asn Lys Cys Trp Asn Trp Phe Asp
65                  70                  75                  80

Ser Asn His Gln Ser Arg Gly Arg Gly Glu Pro Ala Ile Ile Ala Gly
                85                  90                  95

Met Val Glu Leu Val Met Arg Asn Tyr Ser Val Asp Ser Arg Arg Val
            100                 105                 110

Tyr Leu Ala Gly Leu Ser Ala Gly Gly Ala Met Ile Val Ile Met Leu
            115                 120                 125

Ala Thr Tyr Pro Asp Val Phe Ala Ala Ile Trp Val Gly Ser Gly Leu
130                 135                 140

Pro Tyr Lys Leu Ala Thr Ser Met Thr Ser Ala Tyr Met Ala Met Ile
145                 150                 155                 160

Asn Gly Gly Pro Asp Pro Val Gln Leu Gly Asn Leu Ala Tyr Gln Ala
                165                 170                 175

Met Gly Ser His Ala Arg Val Val Pro Val Ile Val Phe His Gly Thr
            180                 185                 190

Ser Asp Tyr Thr Val Tyr Pro Val Asn Leu His Gln Val Ile Ser Gln
            195                 200                 205

Trp Ala Gln Thr Asn Asp Arg Ala Gly Asp Gly Val Asp Asn Asn His
            210                 215                 220

Ile Asp Asp Gln Ala Asp Val Thr Met Asn Gly Ser Val Pro Asn Gly
225                 230                 235                 240

Arg Thr Tyr Thr Arg Tyr Leu Tyr Lys Asp Gln Asn Gly Asn Val Val
                245                 250                 255

Met Glu Leu Trp Met Val Asn Gly Met Gly His Ala Trp Ser Gly Gly
            260                 265                 270

Ser Thr Ala Gly Thr Tyr Thr Asp Pro Ala Gly Pro Glu Ala Ser Ser
            275                 280                 285

Met Met Trp Ser Phe Phe Val Asn His Pro Lys
            290                 295

```
<210> SEQ ID NO 13
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (49)..(49)
<223> OTHER INFORMATION: L or I
<220> FEATURE:
<221> NAME/KEY: MOD_RES
<222> LOCATION: (62)..(62)
<223> OTHER INFORMATION: L, W, Y, I or F
<220> FEATURE:
<221> NAME/KEY: MOD_RES
<222> LOCATION: (100)..(100)
<223> OTHER INFORMATION: L or F
<220> FEATURE:
<221> NAME/KEY: MOD_RES
<222> LOCATION: (114)..(114)
<223> OTHER INFORMATION: L, I, F, Y or V
```

```
<220> FEATURE:
<221> NAME/KEY: MOD_RES
<222> LOCATION: (124)..(124)
<223> OTHER INFORMATION: I, L, T or A
<220> FEATURE:
<221> NAME/KEY: MOD_RES
<222> LOCATION: (128)..(128)
<223> OTHER INFORMATION: L, F, I, W, A, M, V or E
<220> FEATURE:
<221> NAME/KEY: MOD_RES
<222> LOCATION: (202)..(202)
<223> OTHER INFORMATION: L, F or I

<400> SEQUENCE: 13
```

| | | | | | | | | | | | | | | |
|---|---|---|---|---|---|---|---|---|---|---|---|---|---|---|
| Gly | Gln | Phe | Ile | Arg | Asp | Thr | Ala | Pro | Asp | Gly | Arg | Val | Tyr | Phe | Leu |
| 1 | | | | 5 | | | | | 10 | | | | | 15 | |
| Tyr | Ile | Pro | Ser | Gly | Tyr | Asn | Gly | Ser | Thr | Pro | Leu | Pro | Leu | Val | Val |
| | | | 20 | | | | | 25 | | | | | 30 | | |
| Met | Leu | His | Gly | Cys | Thr | Gln | Asn | Pro | Asp | Asp | Phe | Ala | Ala | Gly | Thr |
| | | 35 | | | | | 40 | | | | | 45 | | | |
| Xaa | Met | Asn | Val | Tyr | Ala | Glu | Gln | Asn | Asn | Phe | Leu | Val | Xaa | Tyr | Pro |
| | 50 | | | | | 55 | | | | | 60 | | | | |
| Glu | Gln | Pro | Ser | Ser | Ala | Asn | Leu | Asn | Lys | Cys | Trp | Asn | Trp | Phe | Asp |
| 65 | | | | | 70 | | | | | 75 | | | | | 80 |
| Ser | Asn | His | Gln | Ser | Arg | Gly | Arg | Gly | Glu | Pro | Ala | Ile | Ile | Ala | Gly |
| | | | | 85 | | | | | 90 | | | | | 95 | |
| Met | Val | Glu | Xaa | Val | Met | Arg | Asn | Tyr | Ser | Val | Asp | Ser | Arg | Arg | Val |
| | | | 100 | | | | | 105 | | | | | 110 | | |
| Tyr | Xaa | Ala | Gly | Leu | Ser | Ala | Gly | Gly | Ala | Met | Xaa | Val | Ile | Met | Xaa |
| | | 115 | | | | | 120 | | | | | 125 | | | |
| Ala | Thr | Tyr | Pro | Asp | Val | Phe | Ala | Ala | Ile | Trp | Val | Gly | Ser | Gly | Leu |
| | 130 | | | | | 135 | | | | | 140 | | | | |
| Pro | Tyr | Lys | Ala | Ala | Thr | Ser | Met | Thr | Ser | Ala | Tyr | Met | Ala | Met | Ile |
| 145 | | | | | 150 | | | | | 155 | | | | | 160 |
| Asn | Gly | Gly | Pro | Asp | Pro | Val | Gln | Leu | Gly | Asn | Leu | Ala | Tyr | Gln | Ala |
| | | | | 165 | | | | | 170 | | | | | 175 | |
| Met | Gly | Ser | His | Ala | Arg | Val | Val | Pro | Val | Ile | Val | Phe | His | Gly | Thr |
| | | | 180 | | | | | 185 | | | | | 190 | | |
| Ser | Asp | Tyr | Thr | Val | Tyr | Pro | Val | Asn | Xaa | His | Gln | Val | Ile | Ser | Gln |
| | | | 195 | | | | | 200 | | | | | 205 | | |
| Trp | Ala | Gln | Thr | Asn | Asp | Arg | Ala | Gly | Asp | Gly | Val | Asp | Asn | Asn | His |
| | 210 | | | | | 215 | | | | | 220 | | | | |
| Ile | Asp | Asp | Gln | Ala | Asp | Val | Thr | Met | Asn | Gly | Ser | Val | Pro | Asn | Gly |
| 225 | | | | | 230 | | | | | 235 | | | | | 240 |
| Arg | Thr | Tyr | Thr | Arg | Tyr | Leu | Tyr | Lys | Asp | Gln | Asn | Gly | Asn | Val | Val |
| | | | | 245 | | | | | 250 | | | | | 255 | |
| Met | Glu | Lys | Ile | Met | Val | Asn | Gly | Met | Gly | His | Ala | Trp | Ser | Gly | Gly |
| | | | 260 | | | | | 265 | | | | | 270 | | |
| Ser | Thr | Ala | Gly | Thr | Tyr | Thr | Asp | Pro | Ala | Gly | Pro | Glu | Ala | Ser | Ser |
| | | | 275 | | | | | 280 | | | | | 285 | | |
| Met | Met | Trp | Ser | Phe | Phe | Val | Asn | His | Pro | Lys | | | | | |
| | 290 | | | | | 295 | | | | | | | | | |

```
<210> SEQ ID NO 14
<211> LENGTH: 299
<212> TYPE: PRT
<213> ORGANISM: Artificial Sequence
<220> FEATURE:
<223> OTHER INFORMATION: Description of Artificial Sequence: Synthetic
```

```
                polypeptide
<220> FEATURE:
<221> NAME/KEY: MOD_RES
<222> LOCATION: (114)..(114)
<223> OTHER INFORMATION: L or V

<400> SEQUENCE: 14

Gly Gln Phe Ile Arg Asp Thr Ala Pro Leu Gly Arg Val Tyr Phe Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
        35                  40                  45

Leu Met Asn Val Tyr Ala Glu Gln Asn Asn Phe Leu Val Ala Tyr Pro
    50                  55                  60

Glu Gln Pro Ser Ser Ala Asn Leu Asn Lys Cys Trp Asn Trp Phe Asp
65                  70                  75                  80

Ser Asn His Gln Ser Arg Gly Arg Gly Glu Pro Ala Ile Ile Ala Gly
                85                  90                  95

Met Val Glu Leu Val Phe Arg Asn Tyr Ser Val Asp Ser Arg Arg Val
            100                 105                 110

Tyr Xaa Ala Gly Leu Ser Ala Gly Gly Ala Met Ile Val Ile Met Leu
        115                 120                 125

Ala Thr Tyr Pro Asp Val Phe Ala Ala Ile Phe Val Gly Ser Gly Leu
    130                 135                 140

Pro Tyr Lys Ala Ala Thr Ser Met Thr Ser Ala Tyr Met Ala Met Ile
145                 150                 155                 160

Asn Gly Gly Pro Asp Pro Val Gln Gln Gly Asn Leu Ala Tyr Gln Ala
                165                 170                 175

Met Gly Ser His Ala Arg Val Val Pro Val Ile Val Phe His Gly Thr
            180                 185                 190

Ser Asp Tyr Thr Val Tyr Pro Val Asn Gly His Gln Val Ile Ser Gln
        195                 200                 205

Trp Ala Gln Thr Asn Asp Arg Ala Gly Asp Gly Val Asp Asn Asn His
    210                 215                 220

Ile Asp Asp Gln Ala Asp Val Thr Met Asn Gly Ser Val Pro Asn Gly
225                 230                 235                 240

Arg Thr Tyr Thr Arg Tyr Leu Tyr Lys Asp Gln Asn Gly Asn Val Val
                245                 250                 255

Met Glu Lys Ile Met Val Asn Gly Met Gly His Ala Trp Ser Gly Gly
            260                 265                 270

Ser Thr Ala Gly Thr Tyr Thr Asp Pro Ala Gly Pro Glu Ala Ser Ser
        275                 280                 285

Met Met Trp Ser Phe Phe Val Asn His Pro Lys
    290                 295

<210> SEQ ID NO 15
<211> LENGTH: 299
<212> TYPE: PRT
<213> ORGANISM: Artificial Sequence
<220> FEATURE:
<223> OTHER INFORMATION: Description of Artificial Sequence: Synthetic
      polypeptide
<220> FEATURE:
<221> NAME/KEY: MOD_RES
<222> LOCATION: (124)..(124)
<223> OTHER INFORMATION: I, L, T, A, F, M or V
<220> FEATURE:
<221> NAME/KEY: MOD_RES
```

<222> LOCATION: (128)..(128)
<223> OTHER INFORMATION: L, V, I, W, A, M, V, E, T, C, Y or N

<400> SEQUENCE: 15

Gly Gln Phe Ile Arg Asp Thr Ala Pro Asp Gly Arg Val Tyr Lys Leu
1               5                   10                  15

Tyr Ile Pro Ser Gly Tyr Asn Gly Ser Thr Pro Leu Pro Leu Val Val
            20                  25                  30

Met Leu His Gly Cys Thr Gln Asn Pro Asp Asp Phe Ala Ala Gly Thr
        35                  40                  45

Glu Met Asn Val Tyr Ala Glu Gln Asn Asn Phe Leu Val Ala Tyr Pro
50                  55                  60

Glu Gln Pro Ser Ser Ala Asn Leu Asn Lys Cys Trp Asn Trp Phe Asp
65                  70                  75                  80

Ser Asn His Gln Ser Arg Gly Arg Gly Glu Pro Ala Ser Ile Ala Gly
                85                  90                  95

Val Val Glu Asp Val Lys Arg Asn Tyr Ser Val Asp Ser Arg Arg Val
            100                 105                 110

Tyr Ala Ala Gly Leu Ser Ala Gly Gly Ile Leu Xaa Leu Ile Leu Xaa
        115                 120                 125

Leu Thr Tyr Pro Asp Val Phe Ala Ala Ile Gly Val Gly Ser Gly Leu
130                 135                 140

Glu Tyr Lys Ala Ala Thr Ser Met Thr Ser Ala Tyr Met Ala Met Ile
145                 150                 155                 160

Asn Gly Gly Pro Asp Pro Val Gln Gln Gly Asn Leu Ala Tyr Gln Ala
                165                 170                 175

Met Gly Ser His Ala Arg Val Val Pro Val Ile Val Phe His Gly Thr
            180                 185                 190

Ser Asp Tyr Thr Val Tyr Pro Val Asn Gly His Gln Val Ile Ser Gln
        195                 200                 205

Trp Ala Gln Thr Asn Asp Arg Ala Gly Asp Gly Val Asp Asn Asn His
210                 215                 220

Ile Asp Asp Gln Ala Asp Val Thr Met Asn Gly Ser Val Pro Asn Gly
225                 230                 235                 240

Arg Thr Tyr Thr Arg Tyr Leu Tyr Lys Asp Gln Asn Gly Asn Val Val
                245                 250                 255

Met Glu Lys Ile Met Val Asn Gly Met Gly His Ala Trp Ser Gly Gly
            260                 265                 270

Ser Thr Ala Gly Thr Tyr Thr Asp Pro Ala Gly Pro Glu Ala Ser Ser
        275                 280                 285

Met Met Trp Ser Phe Phe Val Asn His Pro Lys
290                 295

<210> SEQ ID NO 16
<211> LENGTH: 108
<212> TYPE: PRT
<213> ORGANISM: Escherichia coli

<400> SEQUENCE: 16

Ser Asp Lys Ile Ile His Leu Thr Asp Asp Ser Phe Asp Thr Asp Val
1               5                   10                  15

Leu Lys Ala Asp Gly Ala Ile Leu Val Asp Phe Trp Ala Glu Trp Cys
            20                  25                  30

Gly Pro Cys Lys Met Ile Ala Pro Ile Leu Asp Glu Ile Ala Asp Glu
        35                  40                  45

```
Tyr Gln Gly Lys Leu Thr Val Ala Lys Leu Asn Ile Asp Gln Asn Pro
    50                  55                  60

Gly Thr Ala Pro Lys Tyr Gly Ile Arg Gly Ile Pro Thr Leu Leu Leu
65              70                  75                      80

Phe Lys Asn Gly Glu Val Ala Ala Thr Lys Val Gly Ala Leu Ser Lys
                85                  90                  95

Gly Gln Leu Lys Glu Phe Leu Asp Ala Asn Leu Ala
            100             105

<210> SEQ ID NO 17
<211> LENGTH: 6
<212> TYPE: PRT
<213> ORGANISM: Artificial Sequence
<220> FEATURE:
<223> OTHER INFORMATION: Description of Artificial Sequence: Synthetic
      6xHis tag

<400> SEQUENCE: 17

His His His His His His
1               5

<210> SEQ ID NO 18
<211> LENGTH: 6
<212> TYPE: PRT
<213> ORGANISM: Artificial Sequence
<220> FEATURE:
<223> OTHER INFORMATION: Description of Artificial Sequence: Synthetic
      peptide

<400> SEQUENCE: 18

Gly Ser Gly Ser Gly Ser
1               5
```

OPTIMIZATION OF A THERMOPHILIC PHB DEPOLYMERASE FOR INDUSTRIAL APPLICATIONS

RELATED APPLICATIONS

The present application is the national stage entry of International Patent Application No. PCT/US2021/034879 having a filing date of May 28, 2021, which is incorporated herein in their entirety by reference thereto.

SEQUENCE LISTING

This application contains a Sequence Listing which has been submitted electronically in ASCII format and is hereby incorporated by reference in its entirety. Said ASCII copy, created on Oct. 30, 2023, is named KCX-2008-PCTUS-_SL.txt and is 28,612 bytes in size.

BACKGROUND

It has been estimated that over 300,000,000 metric tons of petroleum-based polymers are being produced each year with global production continuing to increase. A significant portion of these polymers are used to produce single-use products, such as plastic drinking bottles, straws, packaging, and personal care products. Most of these plastic products are discarded and do not enter the recycle stream. As the worldwide single-use plastic epidemic worsens, it becomes paramount to identify fully renewable plastics and develop methods and materials that provide for industrial processing of renewable plastics.

Biodegradable polymers produced from renewable resources (also termed "biopolymers") hold great promise for reducing the global accumulation of petroleum-based plastics in the environment. One such class of biopolymers are the polyhydroxyalkanoates (PHA). Much work has been accomplished on the PHA family, most notably the polyhydroxybutyrate (PHB) polymers including poly-3-hydroxybutyrate (P3HB), poly-4-hydroxybutyrate (P4HB), polyhydroxyvalerate (PHV), polyhydroxyhexanoate (PHH), polyhydroxyoctanoate (PHO) and their copolymers. Of particular advantage, PHA exhibit thermoplastic properties that are very similar to some petroleum-based polymers and thus represent viable replacements for petroleum-based polymers such as polypropylene and polyethylene.

PHA are naturally produced across many bacterial, fungal, and archaeal lineages including *Azotobacter, Ralstonia, Burkholderia, Protomonas, Bacillus*, and *Schlegelella* for use as an energy sink. Production of PHA polymers involves a three-step enzymatic mechanism that begins with acetyl coenzyme A. In forming PHB, the first step is catalysis of acetyl-CoA by PhaA (a β-ketothiolase) to form β-ketoacyl-CoA. This, in turn, is converted in a NADP-dependent reaction into R-3-hydroxyacyl-CoA by the PhaB enzyme (a β-ketoacyl-CoA reductase). The final step, catalyzed by PhaC (a PHB synthase), is the polymerization of R-3-hydroxyacyl-CoA into PHB.

In nature, to retrieve the energy stored in the polymer, biodegradation is accomplished by a PHA depolymerase (PHADase). Unfortunately, natural PHADase are generally not conducive to industrial processes, e.g., post-consumer recycle processes, as an enzyme that is used for any bio-industrial process must have several characteristics that typical PHADase lack in sufficient level so as to be industrially useful. To be broadly useful, an enzyme for use in an industrial process should be thermodynamically and/or thermally stable in order to be long-lived in the process. An enzyme should also be as kinetically fast as possible so that a maximum amount of substrate is converted to product in a minimal amount of time. It must also be fully active in the environmental conditions of the industrial process. For example, in a process directed to processing of soiled PHB-containing personal care products (e.g., diaper, feminine pad, incontinence garment, etc.), the enzyme must be able to function in an environment that is contaminated with feces, urine, menstrual fluid, etc. Ideally, the enzyme should be functional in a processing environment that is designed to neutralize contaminants that may be present in used consumer products (e.g., mesophilic bacteria).

One approach that has been examined for incorporating a PHADase into a post-consumer industrial process is to utilize a PHBDase that is halophilic. A high salt environment can kill contaminating bacteria while allowing for full PHBDase activity. Unfortunately, a halophilic approach requires the removal of salt from the reaction product fluid prior to further processing, which adds steps and costs to the process.

A need exists for materials and methods that can increase the use of biopolymers in consumer products and industrial processes. Industrial processing materials and methods that can be used in processing biopolymers from post-consumer personal care products, for instance in a recycling process, would be of great benefit in the art.

SUMMARY

In general, the present disclosure is directed to catalysts for industrial degradation of PHA polymers and systems incorporating the catalysts. PHA polymers for degradation by the catalysts can be components of post-consumer products, such as post-consumer personal care products. Currently, a significant portion of post-consumer products including, without limitation, packaging, straws, cups, bottles, shopping bags, eating utensils, trays, and personal care products such as personal care garments (e.g., diapers, child training pants, disposable swim pants, feminine hygiene products, adult incontinence products), tampon dispensers, medical supplies, etc., are made from petroleum-based polymers. Significant efforts are currently underway to incorporate biopolymers such as PHA into such products, as well as to improve and encourage the recycling of the biopolymers. The present disclosure is directed to improved catalysts and systems that target biopolymers in high-temperature industrial processes for simultaneous degradation and decontamination.

In one aspect, disclosed are methods for treating post-consumer products that include a PHA. For instance, a method can include contacting a post-consumer product, e.g., a post-consumer personal care product, with a polypeptide that catalyzes degradation of the PHA. The contact can take place at contact conditions that include a high temperature, for instance about 45° C. or greater. The catalytic polypeptide can be particularly suited for use in the high-temperature conditions, i.e., a thermophilic catalytic polypeptide. In one embodiment, the polypeptide can include a PHB depolymerase (PHBDase) produced from a thermophile. For instance, the process can include contacting the post-consumer product with a natural PHBDase from a thermophile and/or contacting the post-consumer care product with a thermophile that can produce a PHBDase. In one embodiment, the process can include contacting a post-consumer care product with a polypeptide that includes a modified PHBDase that incorporates one or more single-site mutations as compared to a wild-type PHBDase as produced from a thermophile.

In one aspect, disclosed is a modified PHADase and a transformed cell that expresses the modified PHADase. A modified PHADase as described can exhibit excellent stability and enzymatic activity at high temperature processing conditions, e.g., about 50° C. or greater. A modified PHADase can be based upon a wild-type PHBDase and can include one or more single-site mutations as compared to the wild-type enzyme. In one aspect, mutations can be in regions that are not highly conserved among thermophile PHBDase enzymes so as to provide a modified enzyme that exhibits desired catalytic activity with improved stability and/or kinetic characteristics as compared to a wild-type enzyme.

In one aspect, a modified PHBDase is disclosed that can include one or more single-site mutations as compared to SEQ ID NO: 1, which describes a wild-type PHBDase produced by the thermophile *Lihuazeulla thermophila*. For instance, a modified PHBDase can include a mutation at one or more of positions 3, 10, 15, 33, 41, 44, 49, 50, 62, 67, 78, 91, 92, 93, 97, 100, 102, 114, 122, 123, 124, 125, 127, 128, 129, 135, 139, 144, 145, 148, 152, 157, 159, 160, 167, 169, 184, 189, 200, 202, 206, 209, 233, 259, 260, 261, 269, or 275 of SEQ ID NO: 6.

In one aspect, disclosed is a polypeptide that includes SEQ ID NO: 7, SEQ ID NO: 8, SEQ ID NO: 11, SEQ ID NO: 12, SEQ ID NO: 13, SEQ ID NO: 14, or SEQ ID NO: 15. In one aspect, disclosed is a polypeptide that includes a mutation of the serine at position 124 of SEQ ID NO: 6 to isoleucine, leucine, threonine, alanine, phenylalanine, methionine, or valine and/or that includes a mutation of the glycine at position 128 of SEQ ID NO: 6 to one of leucine, phenylalanine, isoleucine, tryptophan, alanine, methionine, valine, glutamic acid, threonine, cysteine, or tyrosine.

BRIEF DESCRIPTION OF THE DRAWINGS

A full and enabling disclosure of the present subject matter, including the best mode thereof to one of ordinary skill in the art, is set forth more particularly in the remainder of the specification, including reference to the accompanying figures in which.

Figure 1:
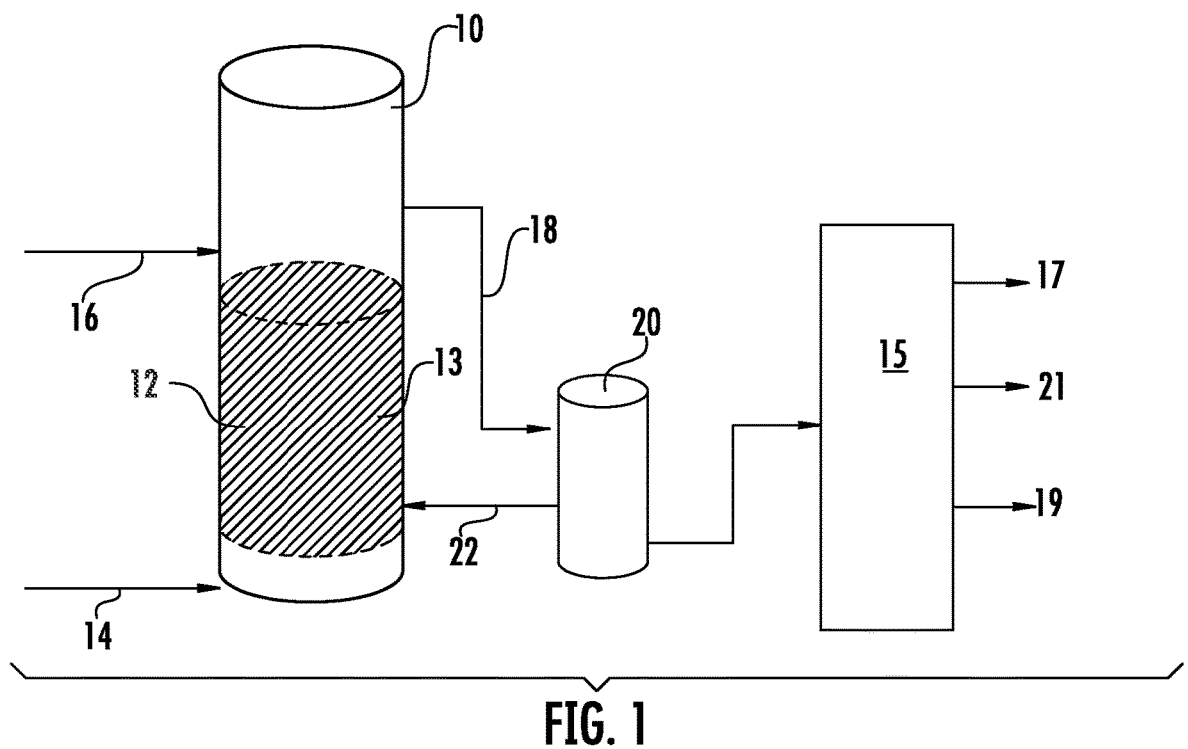
FIG. 1 schematically illustrates a bioreactor as may be utilized according to disclosed methods.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

In order to reduce and eliminate polymer waste, not only is it necessary to replace petroleum-based polymers with biopolymers, but improved post-consumer processing of these polymers is also required. Significant research is currently underway to improve mass processing of biopolymers. Such polymers are well-suited to producing all different types of single-use products, such as drink bottles, containers, packaging, and the like. In addition, those skilled in the art have proposed replacing petroleum-based polymers found in disposable personal care products, such as incontinence products, with biopolymers, such as PHA polymers. The use of biopolymers to replace petroleum-based polymers will make significant strides in creating a sustainable economy.

Most plastic single-use products, such as packaging, straws, cups, bottles, shopping bags, eating utensils, trays, personal care products, etc. are buried in landfills after use. Even if made from biopolymers, these materials will still require a significant amount of time to degrade and often are combined with other, less degradable materials. Moreover, single-use products such as personal care products can be contaminated with human waste, e.g., feces, urine, blood, menstrual fluid, etc. at disposal. In order to further improve the sustainability equation, the present disclosure is directed to a method and system for industrial processing of biopolymers of post-consumer products, and in one particular embodiment, post-consumer personal care products.

In this regard, the present disclosure is generally directed to industrial processing systems and thermophilic enzymes that can be incorporated into the systems for simultaneous degradation and thermal decontamination of biopolymers, and in one particular aspect, of PHAs. In one aspect, the enzymes are wild-type enzymes that can be incorporated into a high-temperature industrial process. In other aspects, modified enzymes are described that can exhibit improved characteristics over the wild-type enzymes when incorporated into an industrial degradation/decontamination process. The materials, methods, and systems of the present disclosure are particularly directed to rapidly degrading and decontaminating used products containing PHA polymers using wild-type and/or modified depolymerase enzymes.

A system as disclosed herein can incorporate a bioreactor within which a high-temperature decontamination and depolymerization operation can be carried out. One embodiment of a bioreactor system is schematically illustrated in FIG. 1. A bioreactor 10 can generally be formed of a material that can contain the enzymes, reactants, and products at the desired high temperature conditions. For instance, a bioreactor can include stainless steel, borosilicate glass, Teflon®, and other nonreactive temperature insensitive composite polymers, and so forth.

The bioreactor 10 can include a reaction zone 12, which can provide a contact area between an enzyme and a biopolymer for a period of time at a temperature to encourage degradation and thermal decontamination of the biopolymer. To encourage thermal decontamination, the bioreactor 10 can include heating elements, for instance can be jacketed with water or steam jackets (not shown in FIG. 1), to maintain desired temperature to be maintained in the reaction zone 12. To provide decontamination activity, for instance destruction of mesophilic bacteria as may be present in post-consumer personal care products, the bioreactor 10 can be capable of maintaining a temperature in the reaction zone of about 45° C. or greater, about 50° C. or greater, about 55° C. or greater, or about 60° C. or greater in some embodiments, for instance from about 45° C. to about 90° C., from about 50° C. to about 85° C., or from about 55° C. to about 80° C. in some embodiments.

To provide biodegradation activity, the reaction zone 12 can include an enzyme and/or a microorganism that expresses an enzyme that catalyzes the degradation of a biopolymer. For instance, an enzyme and/or a microorganism that expresses an enzyme can be fed to a reactor 10 via an inlet stream 14, can be previously retained within a bed 13 within the reactor 10 that defines the reaction zone 12, or any combination thereof.

Enzymes for use in a system can encompass those that can provide catalytic activity at the high temperatures of the reaction zone 12. In one embodiment, an enzyme can be a naturally occurring, i.e., wild-type thermophilic enzyme expressed by a thermophilic microorganism, and as such, capable of providing the desired functionality at the desired high temperatures of a reaction zone 12. In one aspect, an enzyme can be a PHADase, and in one particular aspect, can be a PHBDase.

Among the PHADase, multi-domain PHBDase have been extensively examined. Multi-domain PHBDase generally have a domain structure including a catalytic domain (CD) at an N-terminus, a substrate-binding domain (SBD) at a C-terminus, and a linker region connecting the two domains, however, the multi-domain structure is not universal, and depolymerases from other sources, such as *Penicillium funiculosum* and *Paucimonas lemoignei*, have emerged as single-domain PHBDase. Genetic analysis also shows that PHBDase can contain a lipase box pentapeptide as an active residue, indicating that these enzymes are one of the serine hydrolases. The enzymatic degradation of PHB is believed to proceed via a two-step reaction including a first step, in which the PHBDase approaches and adheres to the PHB surface followed by hydrolysis of the polymer chain.

There are a number of thermophilic microorganisms known to express PHADase capable of catalytic activity at high temperature encompassed in the present disclosure. For instance, and without limitation, thermophilic microorganisms of the genus *Thermus* (e.g., *T. thermophilius*), *Schlegelella* (e.g., *S. thermodepolymerans*), *Streptomyces*, *Thermobifida*, *Lihuaxuella* (e.g., *L. thermophila*), *Bordetella* (e.g., *B. parapertussis*), and *Penicillium* (e.g., *P. funiculosum*) express PHADase as may be incorporated in an industrial system as described.

In one aspect, disclosed is a modified thermophilic enzyme and a cell that expresses a modified thermophilic enzyme that can provide desired catalytic activity in an industrial process as described. For instance, a modified enzyme can be derived from a wild-type thermophilic PHADase and can include one or more single-site mutations that can improve one or more characteristics of a process. For instance, one or more single-site mutations to a wild-type thermophilic PHADase can improve thermal stability of the polypeptide and/or thermodynamic characteristics of the polypeptide, which can increase the functional lifetime of an enzyme in an industrial process; can improve the kinetic characteristics of the polypeptide, which can increase the degradation rate of a polymer in an industrial process; and/or can improve the stability of the polypeptide in the chemical environment of the process, for instance, increase the functional lifetime of the polypeptide in the presence of post-consumer personal care product contaminants including, without limitation, blood, menses, urine, feces, etc.

In one embodiment, single-site mutation of a wild-type enzyme can include replacement of one amino acid residue with another that is biologically and/or chemically similar, which is generally known as a conservative substitution, and that can improve stability, kinetics, or some other aspect of the modified enzyme. For example, a conservative substitution could include replacing one hydrophobic residue (A, L, G, W, F, I, P, V) for another, one hydrophilic residue (Q, S, T, M, H, Y) for another, one positive residue (R, K) for another, one negative residue (E, D) for another, etc. Amino acids are represented herein according to standard single letter or three letter notation, as is generally known in the art and described in Table 1, below.

TABLE 1

| Amino acid | 3-letter code | 1-letter code | Amino acid | 3-letter code | 1-letter code |
|---|---|---|---|---|---|
| Alanine | Ala | A | Arginine | Arg | R |
| Asparagine | Asn | N | Aspartate | Asp | D |
| Cysteine | Cys | C | Glutamine | Gln | Q |
| Glycine | Gly | G | Glutamic Acid | Glu | E |
| Histidine | His | H | Isoleucine | Ile | I |
| Leucine | Leu | L | Lysine | Lys | K |
| Methionine | Met | M | Phenylalanine | Phe | F |
| Proline | Pro | P | Serine | Ser | S |
| Threonine | Thr | T | Tryptophan | Trp | W |
| Tyrosine | Tyr | Y | Valine | Val | V |

In one embodiment, a wild-type enzyme can be modified to include one or more single-site mutations that can increase the thermodynamic and thermal stability of a protein. For instance, this can be accomplished by increasing the number of noncovalent molecular interactions within the enzyme (e.g., increasing the number of hydrogen bonds between protein side chains) or by filling internal cavities of an enzyme. An approach that encompasses mutations that fill internal cavities of an enzyme can be straightforward as it can be performed manually by visually inspecting the 3D enzyme structure, identifying cavities/voids, and mutating residues within the void until a substitution is found that maximally fills the void and is tolerated by surrounding residues.

Examples of single-site mutations that can fill internal cavities of an enzyme can include replacing an amino acid having a relatively small side chain (e.g., V, K, A, D, E, S, G) with an amino acid having a larger side chain (e.g., F, L, W, Y, H). In one embodiment, single-site mutations that can improve stability of an enzyme can include replacement of one or more of K, A, D, E, S, G with an L or an F amino acid. As described further herein, incorporation of one or more single-site mutations in a wild-type enzyme that includes replacement of an amino acid selected from K, A, D, E, S, or G with an L can increase thermal stability of the modified enzyme as compared to the wild-type enzyme without loss of function. In another embodiment, single-site mutations that can alter surface charge and hydrophobicity of an enzyme can be carried out that can improve solubility and stability; for instance, replacement of a proline (P) with a glutamic acid (E) can improve solubility and stability of a modified enzyme as compared to a wild-type enzyme on which it is based.

In one embodiment, the change in stability of a modified enzyme as compared to a wild-type enzyme from which it was derived can be described by its Gibbs free energy value or $\Delta G$. Although $\Delta G$ is a single value, it can be deconstructed by methods known in the art to the free energy per residue in an ensemble calculation that approximates the contribution of a single amino acid to the overall free energy. While modified enzymes described herein can exhibit an increase in stability as compared to the wild-type enzyme, it should be understood that this is not a requirement of a modified enzyme. For instance, in some embodiments, a modified enzyme as described can be less stable than the wild-type, which can provide for an increased biopolymer degradation rate.

In one embodiment, a single-site mutation of a modified enzyme can have a $\Delta\Delta G$ value at that site (defined as the difference between the wild-type single site $\Delta G$ ($\Delta G_{WT}$) and the mutation single site $\Delta G$ ($\Delta G_{MUT}$) of about 1 kcal/mol or greater, about 1.5 kcal/mol or greater, or about 2 kcal/mol or greater in some embodiments. For instance, all single-site mutations of a modified enzyme can have a $\Delta\Delta G$ value that is about 1 kcal/mol or greater, about 1.5 kcal/mol or greater, or about 2 kcal/mol or greater, in some embodiments.

In one embodiment the optimum temperature ($T_{opt}$) of a modified enzyme, defined herein as the temperature at which an enzyme is most active (i.e., the highest rate of the biological reaction that it catalyzes), can be about 5° C. or greater than the $T_{opt}$ of the wild-type enzyme on which the modified enzyme is based. For instance, when considering formation of a modified a *L. thermophila*-based modified PHBDase, a modified enzyme can have a $T_{opt}$ of about 58° C. or greater, such as about 60° C. or greater, such as about 65° C. or greater, for instance from about 60° C. to about 70° C. in some embodiments.

In one embodiment, the specificity of a modified enzyme, defined herein as the ratio of the catalytic rate constant ($k_{cat}$) to the Michaelis constant ($K_m$) can be about 0.35 $s^-\mu M^{-1}$ or higher, such as about 0.40 $s^{-1}$ $\mu M^{-1}$ or higher, such as about 0.45 $s^{-1}$ $\mu M^{-1}$ or higher, such as about 0.50 $s^-\mu M^{-1}$ or higher, for instance from about 0.35 $s^-\mu M^{-1}$ to about 0.75 $s^-\mu M^{-1}$ in some embodiments.

In one embodiment, a modified enzyme as may be utilized in an industrial process can be derived from a wild-type *Lihuaxuella thermophila* PHBDase. For instance, a modified enzyme can be derived from SEQ ID NO: 1, which describes an amino acid sequence of an *L. thermophila* PHBDase that is known in the art (GenBank Accession No. WP_089972404) or from SEQ ID NO: 6, which is the *L. thermophila* PHBDase absent the leading 22 amino acid signal sequence of SEQ ID NO: 1 and an alanine cloning artifact.

In general, a modified enzyme can retain active site fragments of a wild-type enzyme to ensure continued functionality (e.g., SBD, CD, etc.). For instance, and without wishing to be bound to any particular theory, when considering a modified enzyme derived from the *L. thermophila* PHBDase, the modified enzyme can retain SEQ ID NO: 2, SEQ ID NO: 3, SEQ ID NO: 4, and SEQ ID NO; 5 without mutation, which are believed to describe active site fragments of the *L. thermophila* PHBDase. In some embodiments, such active site fragments can be conserved across species and/or genera.

In one embodiment, a modified enzyme can include one or more single-site mutations as compared to a wild-type PHBDase enzyme described by SEQ ID NO: 6. For instance, a modified enzyme can include single-site mutations at one or more of positions 3, 10, 15, 33, 41, 44, 49, 50, 62, 67, 78, 91, 92, 93, 97, 100, 102, 114, 122, 123, 124, 125, 127, 128, 129, 135, 139, 144, 145, 148, 152, 157, 159, 160, 167, 169, 184, 189, 200, 202, 206, 209, 233, 259, 260, 261, 269, and 275 of SEQ ID NO: 6.

In one embodiment, a modified enzyme can include single-site mutations at one or more of positions 10, 15, 49, 67, 93, 97, 100, 102, 114, 124, 125, 128, 139, 145, 148, 199, 238, 284, and 298 of SEQ ID NO: 6. For instance, SEQ ID NO: 6 can be modified to include one or more of D10L, K15F, E49L, P67L, S93I, V97M, D100L, K102F, A114L, S124I, V125L, G128L, G139F, E145P, A148L, P199E, P238E, P284E, and P298E mutations. For instance, a modified enzyme can include all of these mutations to provide a modified enzyme described by SEQ ID NO: 7. As described further in the examples section, below, this particular modified enzyme includes 15 cavity/void mutations and 4 surface charge mutations. The modified enzyme thus formed is highly soluble, can function (and is stable) at temperatures greater than the wild-type enzyme upon which it is based, and can exhibit a longer lifetime in a bio-industrial process.

In one embodiment, a modified enzyme can include single-site mutations at one or more of positions 3, 33, 41, 44, 50, 78, 91, 92, 114, 122, 123, 127, 129, 135, 144, 152, 157, 159, 160, 167, 184, 189, 200, 206, 209, 233, 261, 269, and 275 of SEQ ID NO: 6. For instance, SEQ ID NO: 6 can be modified to include one or more of: F3V, M33V, P41W, F44I, M50L, W78L, P91L, A92P, A114V, A122I, M123L, M127L, A129L, F135L, L144W, M152W, M157L, M159L, I160G, V167P, V184P, F189W, V200P, I206L, W209I, M233I, M261L, W269V, A275G. For instance, a modified enzyme can include all of these mutations to provide a modified enzyme as described by SEQ ID NO: 8. As described further in the examples section, below, this particular modified enzyme includes 29 single-site mutations as compared to the wild-type enzyme. This modified enzyme can exhibit improved stability and kinetic parameters as compared to the wild-type enzyme, with significantly longer activity capability as compared to the wild-type enzyme.

In one embodiment, a modified enzyme can include single-site mutations at one or more of positions 10, 15, 49, 62, 93, 97, 100, 102, 114, 124, 128, 139, 145, 148, 169, 202, 259, 260 of SEQ ID NO: 6. For instance, a modified enzyme can include one or more of the following single-site mutations: one of D10L, D10F; one of K15F, K15L, K15W; one of E49L, E49I, E49V, E49F; one of A62L, A62W, A62Y, A62I, A62F, A62M, A62V, A62C; one of S93I, S93L; V97M; one of D100L, D100F, D100I, D100W, D100V; one of K102M, K102F, K102L; one of A114L, A114I, A114F, A114Y, A114V, A114M; one of S124I, S124L, S124T, S124A, S124F, S124M, S124V; one of G128L, G128F, G128I, G128W, G128A, G128M, G128V, G128E, G128T, G128C, G128Y, G128N; one of G139W, G139F, G139Y, G139L, G139I; E145P; one of A148L, A148C, A148F; one of Q169L, Q169W, Q169I; one of G202L, G202F, G202I, G202V, G202M, G202W; K259L; I260W. For instance, a modified enzyme can include one of these mutations at each of these sites (SEQ ID NO: 11).

By way of example, in one embodiment, a modified enzyme can include one or more of the following single-site mutations: D10L, K15F, E49L, A62L, S93I, V97M, D100L, K102M, A114L, S124I, G128L, G139W, E145P, A148L, Q169L, G202L, K259L, I260W as compared to SEQ ID NO: 6. For instance, a modified enzyme can include all of these mutations (SEQ ID NO: 12) as compared to SEQ ID NO: 6.

In one embodiment, a modified enzyme can include one or more of the following single-site mutations: K15F; one of E49L, E49I; one of A62L, A62W, A62Y, A62I, A62F; S93I; V97M; one of D100L, D100F; K102M; one of A114L, A114I, A114F, A114Y, A114V; one of S124I, S124L, S124T, S124A; one of G128L, G128F, G128I, G128W, G128A, G128M, G128V, G128E; G139W; E145P; Q169L; one of G202L, G202F, G202I as compared to SEQ ID NO: 6. For instance, a modified enzyme can include one of these mutations at each of these sites (SEQ ID NO: 13) as compared to as compared to SEQ ID NO: 6.

In one embodiment, a modified enzyme can include one or more of the following single-site mutations: D10L, K15F, E49L, S93I, V97M, D100L, K102F, A114L, A114V, S124I, G128L, G139F, E145P as compared to SEQ ID NO: 6. For instance, a modified enzyme can include all of these mutations (SEQ ID NO: 14) as compared to SEQ ID NO: 6.

In one embodiment, a modified enzyme can include at least one single-site mutation between position 121 and 130 of SEQ ID NO: 6. For instance, at least one of positions no. 121 to 130 of SEQ ID NO: 6 can be modified to one of the following: I, L, T, A, F, M, V, W, E, C, N to provide a modified enzyme as described. For instance, a modified enzyme can include one or more of the following single-site mutations: A122I; M123L; one of S124I, S124L, S124T, S124A, S124F, S124M, S124V; V125L; M127L; one of G128L, G128F, G128I, G128W, G128A, G128M, G128V, G128E, G128T, G128C, G128Y, G128N; A129L as compared to SEQ ID NO: 6. For instance, a modified enzyme can include one of these mutations at each of these sites (SEQ ID NO: 15). In another embodiment, a modified enzyme can include a mutation of the serine at position 124 of SEQ ID NO: 6 to one of I, L, T, A, F, M, or V and/or a mutation of the glycine at position 128 of SEQ ID NO: 6 to one of L, F, I, W, A, M, V, E, T, C, or Y to provide a modified enzyme as described.

A transformed cell or a cell-free expression system that can express a polypeptide as described is also encompassed herein. In one embodiment, a transformed cell can be derived from a thermophile that naturally expresses a thermophilic wild-type enzyme as described, e.g., a thermophile that naturally produces the wild-type enzyme on which the modified enzyme is based. In other embodiments, a transformed cell can be of a different type than the wild-type cell that naturally expresses a thermophilic enzyme and can be transformed to express either a wild-type or a modified thermophilic enzymatic polypeptide.

An enzyme can be expressed by transformation of a suitable host organism, for example, by use of either prokaryotic or eukaryotic host cells. Examples of host cell types include, without limitation, bacterial cells (e.g., *E. coli*), yeast cells (e.g., *pichia, S. cerevisiae*), cultured insect cell lines (e.g., *Drosophila*), plant cell lines (e.g., maize, tobacco, rice, sugarcane, potato tuber), and mammalian cells lines (e.g., Chinese Hamster Ovary (CHO)). In one embodiment, a recombinant host cell system can be selected that processes and post-translationally modifies nascent polypeptides in a manner desired to produce the final catalytic polypeptide.

A nucleic acid sequence that encodes an enzyme may be placed in an expression vector for expression in the selected host. Such expression vectors can generally comprise a transcriptional initiation region linked to the nucleic acid sequence that encodes the enzyme. An expression vector can also include a plurality of restriction sites for insertion of the nucleic acid to be under the transcriptional regulation of various control elements. The expression vector additionally may contain selectable marker genes. Suitable control elements such as enhancers/promoters, splice junctions, polyadenylation signals, etc. may be placed in close proximity to the coding region to permit proper initiation of transcription and/or correct processing of the primary transcript, i.e., the coding region for the enzyme. Alternatively, the coding region utilized in an expression vector may contain endogenous enhancers/promoters, splice junctions, intervening sequences, polyadenylation signals, etc., or a combination of both endogenous and exogenous control elements.

An expression vector generally includes in the 5'-3' direction of transcription, a promoter, a transcriptional and translational initiation region, a DNA sequence that encodes the enzyme, and a transcriptional and translational termination region functional in the host cell. In one embodiment, a T7-based vector can be used, which can include at least the following components: an origin of replication, a selectable antibiotic resistance gene (e.g., amp$^r$, tet$^r$, chlrr), a multiple cloning site, T7 initiator and terminator sequences, a ribosomal binding site, and a T7 promoter.

In general, any suitable promoter may be used that is capable of operative linkage to the heterologous DNA such that transcription of the DNA may be initiated from the promoter by an RNA polymerase that may specifically recognize, bind to, and transcribe the DNA in an open reading frame. Some useful promoters include, constitutive promoters, inducible promoters, regulated promoters, cell specific promoters, viral promoters, and synthetic promoters. Moreover, while promoters may include sequences to which an RNA polymerase binds, this is not a requirement. A promoter may be obtained from a variety of different sources. For example, a promoter may be derived entirely from a native gene of the host cell, be composed of different elements derived from different promoters found in nature, or be composed of nucleic acid sequences that are entirely synthetic. A promoter may be derived from many different types of organisms and tailored for use within a given cell. For example, a promoter may include regions to which other regulatory proteins may bind in addition to regions involved in the control of the protein translation, including coding sequences.

A translation initiation sequence can be derived from any source, e.g., any expressed *E. coli* gene. Generally, the gene is a highly expressed gene. A translation initiation sequence can be obtained via standard recombinant methods, synthetic techniques, purification techniques, or combinations thereof, which are all well known. Alternatively, translational start sequences can be obtained from numerous commercial vendors (Operon Technologies; Life Technologies, Inc.).

The termination region may be native with the transcriptional initiation region, may be native with the coding region, or may be derived from another source. Transcription termination sequences recognized by the transformed cell are regulatory regions located 3' to the translation stop codon, and thus together with the promoter flank the coding sequence. Examples include transcription termination sequences derived from genes with strong promoters, such as the trp gene in *E. coli*, as well as other biosynthetic genes.

Vectors that may be used include, but are not limited to, those able to be replicated in prokaryotes and eukaryotes. For example, vectors may be used that are replicated in bacteria, yeast, insect cells, and mammalian cells. Examples of vectors include plasmids, phagemids, bacteriophages, viruses (e.g., baculovirus), cosmids, F-factors, and bacterial artificial chromosomes. Specific vectors may be used for specific cells types. Additionally, shuttle vectors may be used for cloning and replication in more than one cell type. Such shuttle vectors are known in the art. The vector may, if desired, be a bi-functional expression vector that may function in multiple hosts.

An expression vector that encodes a PHADase may be introduced into a host cell by any method known to one of skill in the art and the nucleic acid constructs may be carried extrachromosomally within a host cell or may be integrated into a host cell chromosome, as desired. A vector for use in a prokaryote host, such as a bacterial cell, includes a replication system allowing it to be maintained in the host for expression or for cloning and amplification. A vector may be present in the cell in either high or low copy number. Generally, about 5 to about 200, and usually about 10 to about 150 copies of a high copy number vector are present within a host cell. A host cell containing a high copy number vector will preferably contain at least about 10, and more preferably at least about 20 plasmid vectors. Generally, about 1 to 10, and usually about 1 to 4 copies of a low copy number vector will be present in a host cell.

In many embodiments, bacteria are used as host cells. Examples of bacteria include, but are not limited to, Gram-negative and Gram-positive organisms. In one embodiment an *E. coli* expression system suitable for T7 protein expression may be used. Examples of T7 expression strains can include, without limitation, BL21(DE3), BL21(DE3)pLysS, BLR(DE3)pLysS, Tuner™(DE3)pLysS, Tuner™(DE3), Lemo21(DE3), NiCO2(DE3), Origami™2(DE3), Origami™ B(DE3), SHuffle® T7 Express, HMS174(DE3), HMS174(DE3)pLysS, DH5aplhaE, Rosetta™2(DE3), Rosetta™2(DE3)pLysS, NovaBlue(DE3), Rosetta-gami™ B, Rosetta-gami™ B(DE3), Rosetta-gami™ B(DE3)pLysS, RosettaBlue™ (DE3), Novagen(DE3), Novagen(DE3) pLysS.

An expression vector may be introduced into bacterial cells by commonly used transformation/infection procedures. A nucleic acid construct containing an expression cassette can be integrated into the genome of a bacterial host cell through use of an integrating vector. Integrating vectors usually contain at least one sequence that is homologous to the bacterial chromosome that allows the vector to integrate. Integrating vectors may also contain bacteriophage or transposon sequences. Extrachromosomal and integrating vectors may contain selectable markers to allow for the selection of bacterial strains that have been transformed.

Useful vectors for an *E. coli* expression system may contain constitutive or inducible promoters to direct expression of either fusion or non-fusion proteins. With fusion vectors, a number of amino acids are usually added to the expressed target gene sequence. Additionally, a proteolytic cleavage site may be introduced at a site between the target recombinant protein and the fusion sequence. Once the fusion protein has been purified, the cleavage site allows the target recombinant protein to be separated from the fusion sequence. Enzymes suitable for use in cleaving the proteolytic cleavage site include TEV, Factor Xa, and thrombin. Fusion expression vectors which may be useful in the present can include those which express, for example and without limitation, Maltose Binding Protein (MBP), Thioredoxin (THX), Chitin Binding Domain (CBD), Hexahistadine tag (His-tag) (SEQ ID NO: 17), glutathione-S-transferase protein (GST), FLAG peptide, N-utilization substance (NusA), or Small ubiquitin modified (SUMO) fused to the target recombinant enzyme.

Methods for introducing exogenous DNA into a host cell are available in the art and can include the transformation of bacteria treated with $CaCl_2$) or other agents, such as divalent cations and DMSO. DNA can also be introduced into host cells by electroporation, use of a bacteriophage, ballistic transformation, calcium phosphate co-precipitation, spheroplast fusion, electroporation, treatment of the host cells with lithium acetate or by electroporation. Transformation procedures usually vary with the bacterial species to be transformed.

Following transformation or transfection of a nucleic acid into a cell, the cell may be selected for the presence of the nucleic acid through use of a selectable marker. A selectable marker is generally encoded on the nucleic acid being introduced into the recipient cell. However, co-transfection of selectable marker can also be used during introduction of nucleic acid into a host cell. Selectable markers that can be expressed in the recipient host cell may include, but are not limited to, genes that render the recipient host cell resistant to drugs such as actinomycin CI, actinomycin D, amphotericin, ampicillin, bleomycin, carbenicillin, chloramphenicol, geneticin, gentamycin, hygromycin B, kanamycin monosulfate, methotrexate, mitomycin C, neomycin B sulfate, novobiocin sodium salt, penicillin G sodium salt, puromycin dihydrochloride, rifampicin, streptomycin sulfate, tetracycline hydrochloride, and erythromycin. Selectable markers may also include biosynthetic genes, such as those in the histidine, tryptophan, and leucine biosynthetic pathways. Upon transfection or transformation of a host cell, the cell is placed into contact with an appropriate selection agent.

To encourage simultaneous decontamination and degradation of a biopolymer, and referring again to FIG. 1, a polypeptide including an enzyme as described, and/or a cell that expresses the enzyme can be located in a reaction chamber 12 of a bioreactor 10. For instance, in one embodiment, a reaction chamber 12 can include a bed 13 that can include a polymer to be processed and enzyme and/or enzyme producing cells adsorbed onto or otherwise contained within the bed. An enzyme and/or enzyme expressing cell can be pre-loaded onto a bed 13, can be periodically or continuously fed to the reactor 10 via an inlet 14, or some combination thereof.

A second inlet 16 can provide continuous or periodic feed of a polymer to a reaction chamber 12 for simultaneous degradation and decontamination in the reaction zone 12. Any PHA polymer can be degraded and decontaminated according to the present disclosure. A PHA can be a homopolymer or a copolymer. In one embodiment, a PHB-containing material can be fed to the reaction zone 12.

Examples of monomer units that can be incorporated in PHA for processing as described can include 2-hydroxybutyrate, glycolic acid, 3-hydroxybutyrate, 3-hydroxypropionate, 3-hydroxyvalerate, 3-hydroxyhexanoate, 3-hydroxyheptanoate, 3-hydroxyoctanoate, 3-hydroxynonanoate, 3-hydroxydecanoate, 3-hydroxydodecanoate, 4-hydroxybutyrate, 4-hydroxyvalerate, 5-hydroxyvalerate, and 6-hydroxyhexanoate. Examples of PHA homopolymers include poly 3-hydroxyalkanoates (e.g., poly 3-hydroxypropionate (PHP), poly 3-hydroxybutyrate (PHB), poly 3-hydroxyvalerate (PHV), poly 3-hydroxyhexonoate (PHH), poly 3-hydroxyoctanoate (PHO), poly 3-hydroxydecanoate (PHD), and poly 3-hydroxy-5-phenylvalerate (PHPV)), poly 4-hydroxyalkanoates (e.g., poly 4-hydroxybutyrate (hereinafter referred to as PHB) and poly 4-hydroxyvalerate (hereinafter referred to as PHV)), or poly 5-hydroxyalkanoates (e.g., poly 5-hydroxyvalerate (hereinafter referred to as PHV)).

In certain embodiments, the PHA can be a copolymer (containing two or more different monomer units) in which the different monomers are randomly distributed in the polymer chain. Examples of PHA copolymers include poly 3-hydroxybutyrate-co-3-hydroxypropionate (hereinafter referred to as PHB3HP), poly 3-hydroxybutyrate-co-4-hydroxybutyrate (hereinafter referred to as P3HB4HB), poly 3-hydroxybutyrate-co-4-hydroxyvalerate (hereinafter referred to as PHB4HV), poly 3-hydroxybutyrate-co-3-hydroxyvalerate (hereinafter referred to as PHB3HV), poly 3-hydroxybutyrate-co-3-hydroxyhexanoate (hereinafter referred to as PHB3HH) and poly 3-hydroxybutyrate-co-5-hydroxyvalerate (hereinafter referred to as PHB5HV).

In one embodiment, the polymer fed to the reactor 10 via inlet 16 can be preprocessed, for instance, chopped, ground, etc., to provide a large surface area for interaction with enzyme within the reaction zone. Inlet 16 can feed particulate matter including post-consumer PHA through the inlet 16, e.g., a screw type feeder, which can be positioned at the side of the reactor generally near the top of the reaction zone 12, e.g., above the bed 13.

In one embodiment, an inlet 14 can provide flow through the bed 13 to encourage the enzyme to react with the biopolymer. In some embodiments, inlet 14 can provide a flow upward through the reaction chamber 12 and inlet 16 provide continuous or periodic flow of polymer into the reaction zone 12. The flow fed to the reactor 10 via inlet 14 can be buffered as desired to provide the optimal pH for the degradation reaction. For instance, an aqueous flow at a pH of from about 7 to about 9, or from about 7 to about 8 in some embodiments, can be fed via inlet 14, optionally in conjunction with periodic or continuous inclusion of enzyme.

In one embodiment, inlet 14 can be near the bottom of a reactor 10 and can provide a continuous flow upward through the reactor during the reaction period. As the flow from inlet 14 moves upward through the reactor 10, enzyme can likewise move upward through the bed 13 and after degrading PHA in the lower regions of the bed can contact non-degraded polymer at the upper end of the bed 13. During the ongoing degradation process, volume of polymer initially fed to the bed 13 can degrade and additional polymer can be added to the reactor at the top of the bed 13. Thus, enzyme can contact the newly fed polymer, and the rate of addition of polymer can be roughly equal to the rate of enzymatic hydrolysis.

The bioreactor 10 can also include an outlet 18 above the bed 13 through which the degraded and decontamination polymer can exit the reactor 10. Flow through the reactor can be controlled such that the retention time within the bed provides contact between the enzyme and the polymer suitable for hydrolysis reaction. The top of the bed 13 can be fitted in one embodiment with a plate to prevent remaining polymer particles to exit via outlet 18.

Following exit via outlet 18, the reaction product flow can pass through a separator 20, within which any escaped polymer particulate and/or enzyme can be separated from the reactor outflow. For instance, in one embodiment, enzyme can be retained in the reaction zone 12 by immobilization on a support such as a polymeric bead, gel, etc. and the separator 20 can include a physical separation operation to remove any such support material from the outflow and return it to the reactor via line 22.

A system can optionally include a separation operation 15 that can separate the product stream from the reactor into various products, e.g., PHA degradation products (re-usable monomers and/or oligomers) 17, decontaminated waste 19, other polymers 21, etc., for instance via a distillation separation or the like.

The present disclosure may be better understood with reference to the Examples set forth below.

Example 1

The PHBDase sequence from *Lihuaxuella thermophila* was utilized as a representative of an enzyme from a thermophilic organism. The sequence SEQ ID NO: 1 (GenBank Accession No. WP_089972404) is shown below and consists of a 322 amino acid protein including a 22 amino acid N-terminal signal sequence (underlined). Active site consensus structures are shown in bold, and include a 9 amino acid fragment (SEQ ID NO: 2) beginning at V54, a 7 amino acid fragment (SEQ ID NO: 3) beginning at T176, a 6 amino acid fragment (SEQ ID NO: 4) beginning at G263, and SEQ ID NO: a 5 amino acid fragment (SEQ ID NO: 5) beginning at M288.

Since the signal sequence is proteolyzed as part of the export process, all work in this example utilized the 300 amino acid protein (SEQ ID NO: 6), which begins at position 24 of SEQ ID NO: 1.

The mature 300 amino acid primary sequence (SEQ ID NO: 6) had a molecular weight of 32.2 kDa and a 5.39 A isoelectric point (pI). This pI is comprised by 8.7 percent negatively charged and 6.0 percent positively charged amino acid residues. There are two cysteine residues in the protein.

The mature 300 amino acid primary sequence (SEQ ID NO: 6) was converted into a three-dimensional model by the technique of molecular threading. Briefly, the sequence was "threaded" in three-dimensional space along the backbone of a structure from a homologous enzyme. Once the backbone atoms were fixed in space, the model sidechain atoms were used as a guide (to the CB atom) and a model of the sequence amino acids was built onto the mainchain model. The premiere code for this calculation was LOMETS2 (Zheng and Zhang, 2019). To determine the best fit, the *L*.

thermophila sequence was threaded against three homologue PHBDase proteins produced by *Paucimonas lemoignei* (2VTV), *Bordetella parapertussis* (3DOK), and *Penicillium funiculosum* (2D80). Model 'correctness' was gauged by both the RMSD (mainchain to CB atoms) as well as a proprietary scoring function. By both measures, the best model for the *L. thermophila* enzyme was the 2D80 *P. funiculosum* structure.

Figure 2:
FIG. 2 illustrates an energy minimized *L. thermophila* PHBDase model.

The model produced by the threading algorithm was not energy minimized and there was some expected degree of unfavored sidechain torsional angles. To correct these, the *L. thermophila* model was placed into a 30 Å×30 Å×30 Å explicit water box (using the program VMD, Humphrey et al., 1996) and subjected to 3 ns of molecular dynamics (MD). This was accomplished in a three-step protocol. In the first step, all protein atoms were fixed and the solvent was minimized with 1 ns of NPT MD using the NAMD molecular dynamics package (Phillips et al., 2005). The final structure from the first round was subjected to 1 ns of NVT MD with only the sidechain atoms fixed. This round allowed the protein backbone to minimize. The final structure from that round was subjected to 1 ns of NVT MD without any atom position restraints. The final structure represented the energy minimized *L. thermophila* model (FIG. 2). All sidechains were within allowed Ramachandran space.

The model was used for all subsequent studies after all solvent was removed from the coordinate file. As shown in FIG. 2, the structure includes the central β-sheet structure that is composed of six central parallel strands flanked on both sides by two antiparallel strands. There are 9 α-helical regions (3 of which are short 2-3 turn helices). Five of the helices directly flank the central β-sheet. The model had a RMSD of 2.7 Å on mainchain atoms with the 2D80 structure and a LOMETS score of −3.2, which indicates a robust threading result. This model was used to identify all mutation sites described herein as well as model prospective sidechain alterations.

Example 2

All chemicals were purchased from Sigma-Aldrich, including all buffers, media, isopropyl-β-D-thiogalactoside, antibiotics, and polyhydroxybutyrate granules. Chromatography resins were also from Sigma-Aldrich. All laboratory supplies were purchased from Fisher Scientific. Competent *E. coli* were purchased from New England Biolabs, Inc.

The amino acid sequence of the *Lihuaxuella thermophila* PHBDase (SEQ ID NO: 1) was utilized to construct a recombinant DNA expression system. The first 22 amino acids of the sequence corresponding to the putative signal sequence were removed from the protein and replaced by the thioredoxin (THX) protein (SEQ ID NO: 16; aa 2-109 UniProtKB Accession No. sp[P0AA25]), to drive solubility and folding. This THX sequence was followed by a short (GS)3 linker (SEQ ID NO: 18) followed by the sequence: MHHHHHHGSENLYFQS (SEQ ID NO: 9). SEQ ID NO: 9 provides a 6-histidine nickel chelating sequence followed by the TEV protease cleavage site. Upon cleavage the recombinant protein had an N-ter sequence that began SAGQF . . . (SEQ ID NO: 10), i.e., a serine followed by SEQ ID NO: 6. The resulting sequence was reverse translated to DNA and codon optimized for expression in *E. coli* using the program Gene Designer from ATUM, Inc. The gene was assembled using standard PCR techniques by ATUM, Inc. and cloned into the expression vector p454-MR (ampr, medium strength ribosomal binding site) (ATUM, Inc.). The insert was verified by DNA sequencing after construction.

The expression plasmid was used to transform chemically competent Origami™2-(DE3) bacteria. Single colonies were selected from LB-Amp plates and used for expression screening. Colonies were grown at 37° C. for 12 hours in LB media supplemented with 100 µg/mL ampicillin. This culture was used to inoculate fresh LB-AMP flasks at a 1:100 inoculum. These cultures were grown at 37° C. until OD595=0.4 (typically 4 hours) at which time IPTG was added to a final concentration of 1 mM. Growth was continued for 12 hours. Cells were harvested by centrifugation at 10,000×g for 15 minutes and frozen at −80° C. until use (minimal time frozen was 24 hours). Cells were thawed on ice and were resuspended in Buffer A (0.5 M NaCl, 20 mM Tris-HCl, 5 mM imidazole, pH 7.9) (typically 1 mL per gram of cells). Cells were disrupted via two passes through a French Press followed by centrifugation at 30,000×g for 30 minutes. The crude extract was mixed with an equal volume of charged His-Bind resin slurry and the mixture was poured into 5 cm×4.9 cc column. The column was washed with 10 column volumes of wash buffer (0.5 M NaCl, 20 mM Tris-HCl, 60 mM imidazole, pH 7.9) at a flow rate of 0.2 mL/min. Enzyme was eluted from the column with the addition of 3 column volumes of 0.5 M NaCl, 20 mM Tris-HCl, 1.0 M imidazole, pH 7.9. Fractions were collected (1.0 mL). Fractions containing enzyme were pooled after analysis by SDS-PAGE. The pooled fractions were applied to a 70 cm×4.9 cc Sephadex® G-75 column (10 mM Tris-HCl, PH 7.5, 1 mM EDTA). Fractions containing homogeneous protein were pooled (after inspection by SDS-PAGE), concentrated to 5 mg/ml via Centricon® filters. Enzyme was stored frozen at −20° C. until use. The TRX-histidine tag region was removed from the enzymes using TEV protease. Protein was diluted to 1.0 mg/mL into 10 mM Tris-HCl, pH 7.5, 25 mM NaCl. 100 U of TEV protease was added per mg of enzyme (approximate ratio of 1:100 (w/w). The reaction was allowed to proceed for 16 hours at 4° C. The mixture was passed over a charged nickel column. One column volume of eluent was collected representing purified tag-free enzyme.

A turbidometric assay was employed to measure PHBDase activity under various conditions. The standard reaction (final volume=1.0 mL) contained 200 mg/L of PHB granules (that were previously stably suspended via sonication), 1 mM $CaCl_2$), 25 mM buffer at various pH values. The reaction was initiated after the addition of enzyme and monitored at 650 nm in Applied Photophysics' spectrapolarometer in absorbance mode. The reaction was gently stirred and maintained at a constant temperature. OD measurements (typically starting in the range of 2-3) were converted to percent OD remaining as a function of time. Alternatively, a second assay was utilized to measure β-hydroxybutyrate directly using the Sigma-Aldrich MAK272 hydroxybutyrate assay kit. HB was measured fluorometrically ($\lambda ex=535$ nm, $\lambda em=587$ nm). Aliquots (10 µL) were removed from the PHB depolymerase reaction at various time points, mixed with 50 µL of the supplied HB assay buffer, and pipetted into a well of a black, flat bottomed, 96-well plate. The plate was incubated at room temperature in the dark for 30 minutes. Fluorescence emission intensity was measured using a Molecular Dynamics SpectraMax® M5. Fluorescence readings were converted to HB concentration via comparison to a standard curve constructed from known concentrations of pure hydroxybutyrate. All kinetic parameters were calculated per Segel (1993).

Figure 3:
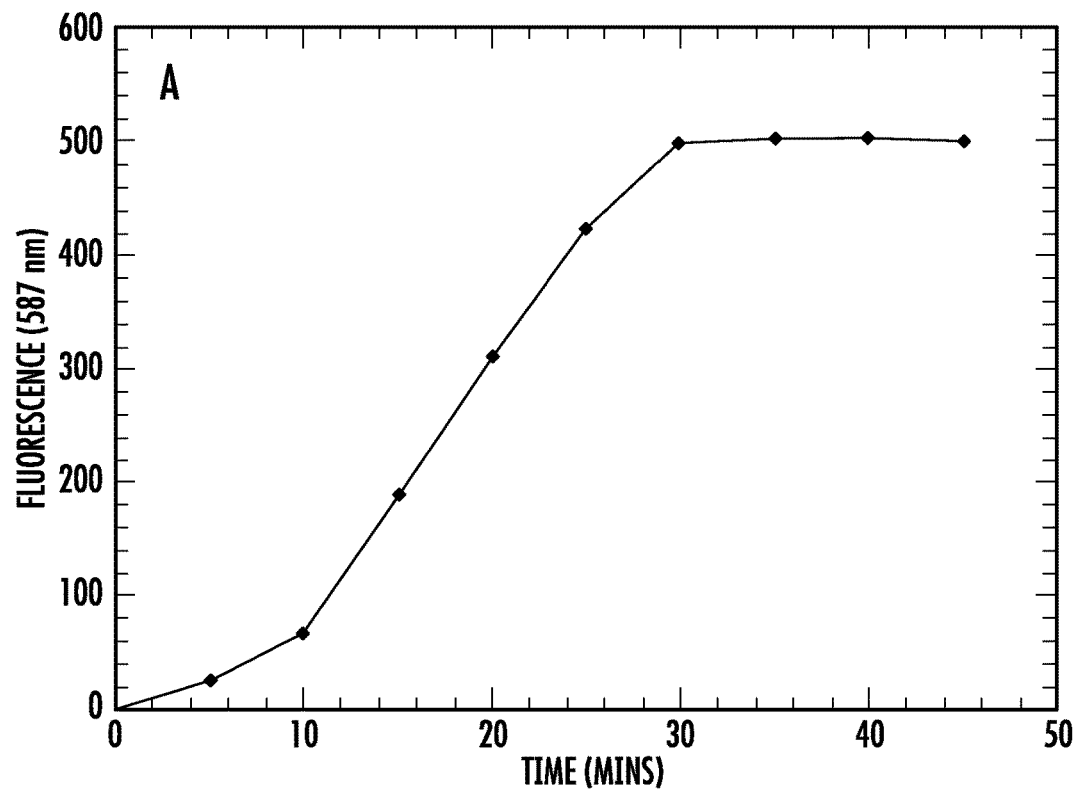
FIG. 3 graphically presents the formation of hydroxybutyrate by action of a purified wild-type *L. thermophila* PHBDase.
Figure 4:
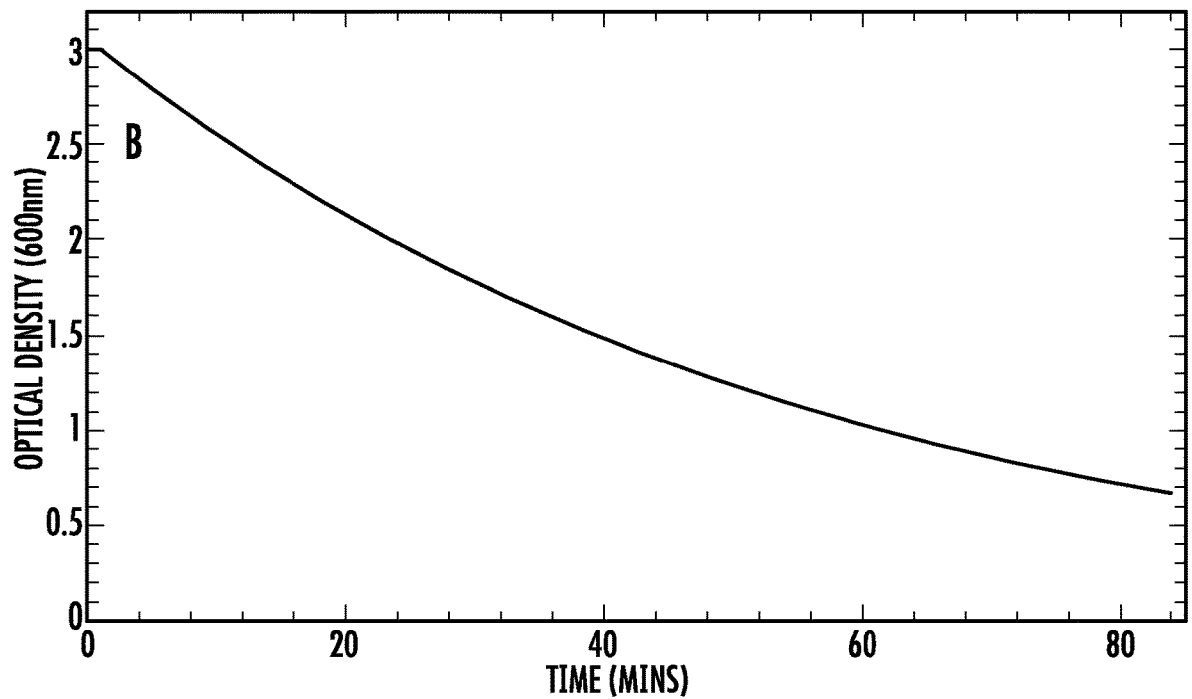
FIG. 4 graphically presents the degradation of PHB granules by action of the purified wild-type *L. thermophila* PHBDase.

The purified *L. thermophila* PHBDase reaction is shown in FIG. 3 and FIG. 4. The two assays measure the same reaction (below). In FIG. 3 the observable is the formation of product while in FIG. 4 it is the degradation of the substrate.

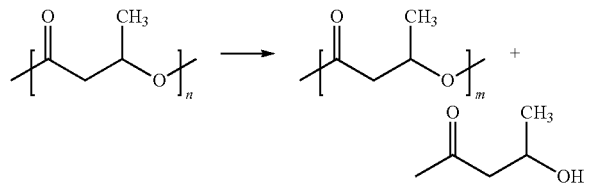

in which m<<n and represents small oligomers, typically 2-4 mers.

The enzyme was fully capable of forming hydroxybutyrate (as measured by the fluorescence assay) as well as degrading PHB granules (as measured by the turbidometric assay). Kinetic constants were calculated from the assays and are shown in Table 2, below, in which $K_m$ is the Michaelis constant, $k_{cat}$ is the catalytic rate constant, $k_{cat}K_m^{-1}$ is the specificity, $pH_{opt}$ is the optimal pH of reaction, and $T_{opt}$ is the optimal temperature of reaction. The values in the table are the mean of three independent determinations and values in parenthesis are the standard deviation.

TABLE 2

| $K_m$ (µM) | $k_{cat}$ (s$^{-1}$) | $k_{cat}K_m^{-1}$ (s$^{-1}$µM$^{-1}$) | $pH_{opt}$ | $T_{opt}$ (° C.) |
|---|---|---|---|---|
| 8.6 (0.2) | 3.2 (0.1) | 0.37 | 7.4 | 53.3 (0.3) |

Example 3

Internal cavities of the wild type protein described above locations were identified either by direct observation or using the programs CAVER (Jurcik et al., 2018) or Beta-CavityWeb (Kim et al., 2015) for potential mutation locations. Once a cavity was identified an amino acid in the cavity was selected for mutation. Selection criteria was based on:
1) the sidechain of the residue pointed into the cavity,
2) the mutation increased cavity packing (using the predominant torsion angle for that amino acid),
3) the mutation could be accommodated in the cavity by neighboring residue sidechains (meaning all steric, electrostatic, or hydrogen bonding was satisfied).

Amino acids were modeled into the cavity using the SWAPAA algorithm in the Chimera package. This analysis identified 15 cavities that were not optimally/maximally packed and single-site mutations at each location. The results of this mutational analysis are shown in Table 3. The ΔΔG values were derived as $\Delta G_{wt} - \Delta G_{mut}$ (WT refers to wild type and mut refers to mutation) and show the stabilizing energetics of the single amino acid substitution. Any potential mutations that were within active site consensus structures (SEQ ID NO: 2, SEQ ID NO: 3, SEQ ID NO: 4, SEQ ID NO: 5) were excluded from use.

TABLE 3

| Mutation | ΔΔG |
|---|---|
| D10L | 1.5 |
| K15F | 1.7 |

TABLE 3-continued

| Mutation | ΔΔG |
|---|---|
| E49L | 1.6 |
| P67L | 1.1 |
| S93I | 1.8 |
| V97M | 1.6 |
| D100L | 2.0 |
| K102F | 1.3 |
| A114L | 2.3 |
| S124I | 2.4 |
| V125L | 1.1 |
| G128L | 3.8 |
| G139F | 1.3 |
| E145P | 2.4 |
| A148L | 1.3 |

Figure 5:
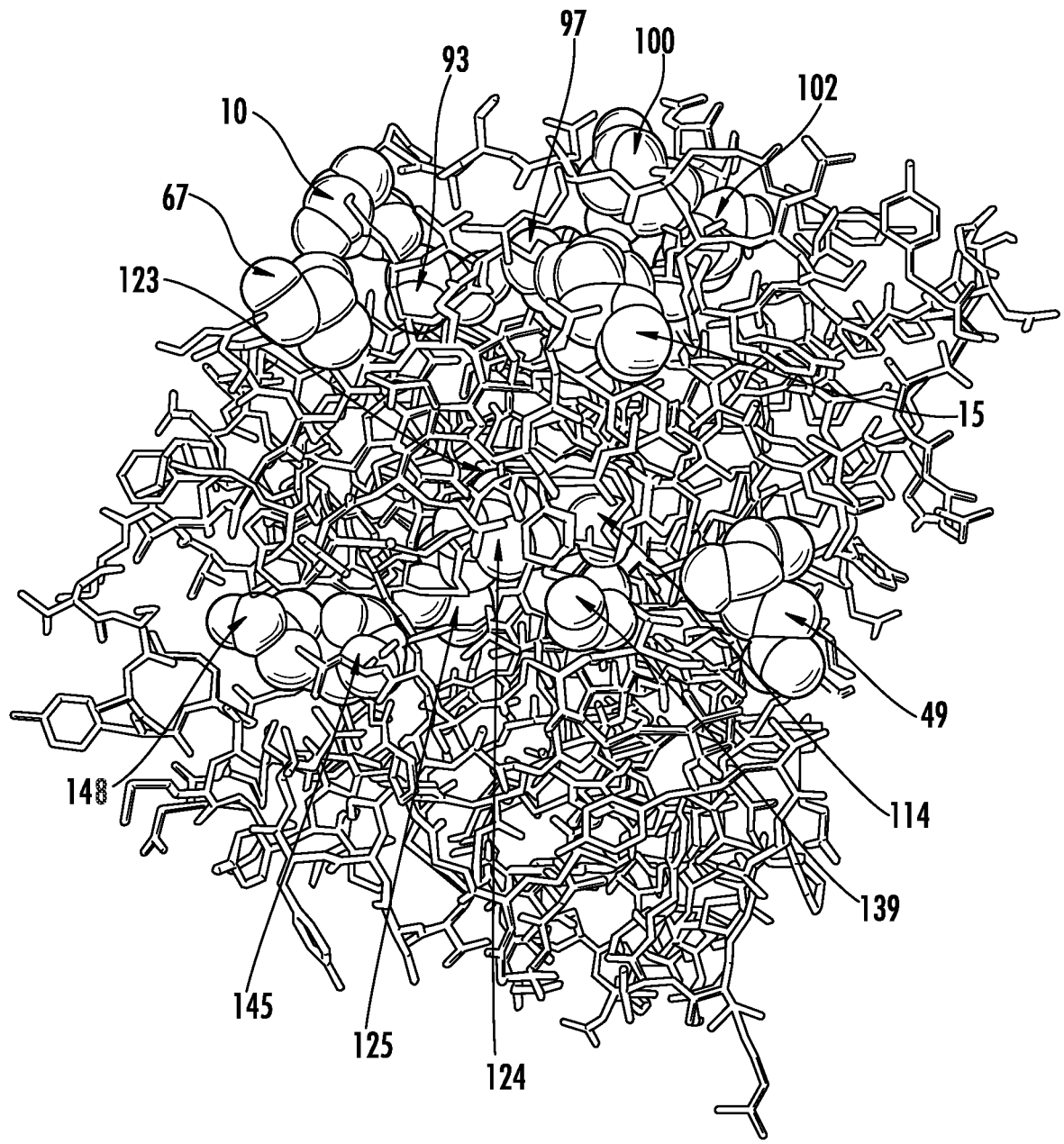
FIG. 5 provides a molecular model of a modified PHBDase showing the position of 15 cavity/void filling stability mutations as compared to an *L. thermophila* wild-type PHBDase.

The 15 residues of Table 3 are shown in the molecular model of the protein presented in FIG. 5. None of these residues are in active site consensus structures (SEQ ID NOs: 1-4).

Figure 6:
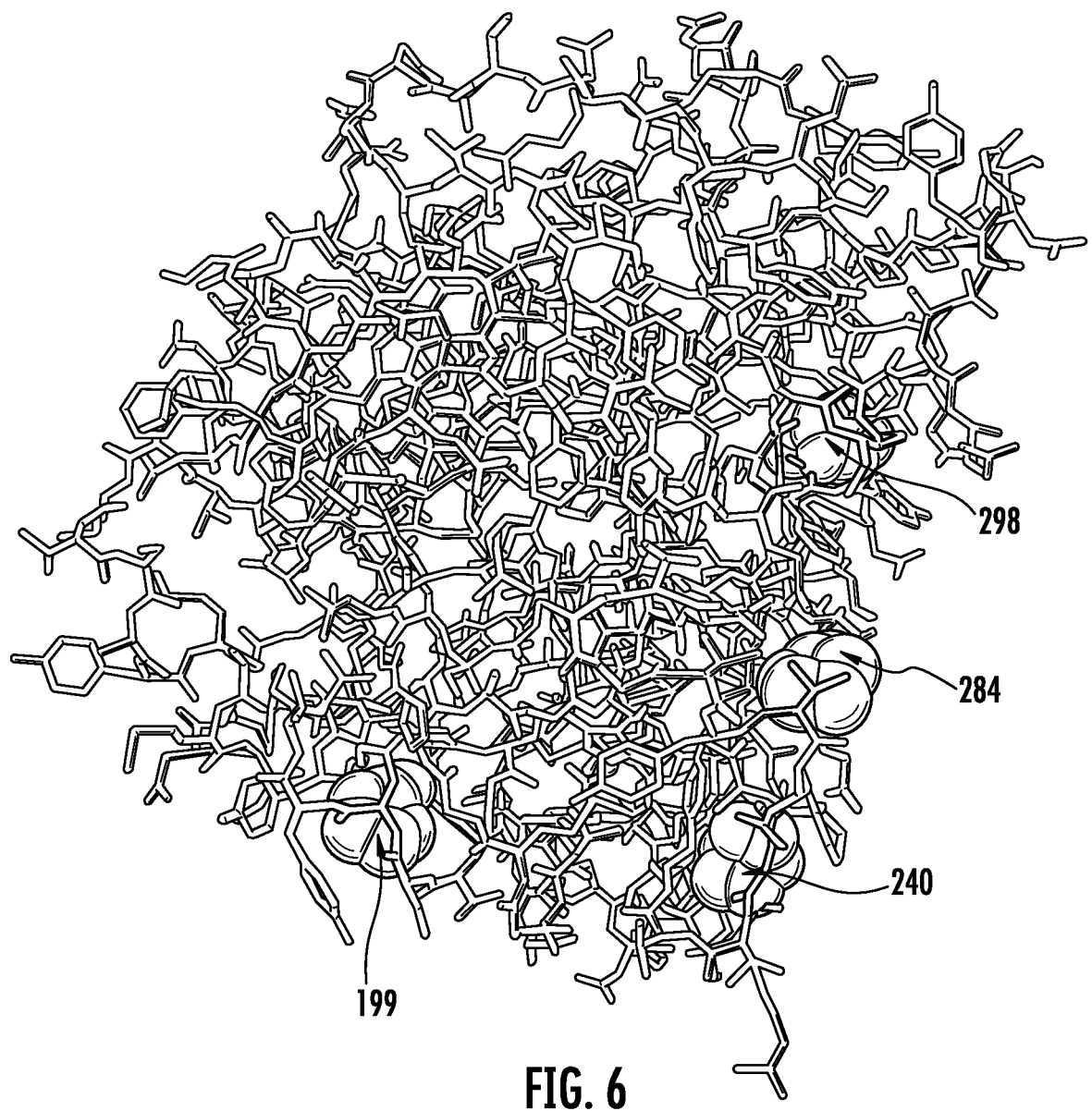
FIG. 6 provides a molecular model of a modified PHBDase showing the position of 4 surface charge stability mutations as compared to an *L. thermophila* wild-type PHBDase.

In addition to the above 15 mutations, surface charge analysis (see, e.g., Jacak and Handrick, 2002; Trevino et al., 2007; Naganathan, 2012; Kramer et al., 2012) indicated that four surface proline residues could be mutated to negatively charged residues (specifically Glutamate): P199E, P238E, P284E, and P298E. These 4 residues are shown in the molecular model of the protein presented in FIG. 6. None of these residues are in active site consensus structures (SEQ ID NOs: 1-4).

A modified enzyme was created that incorporated all 19 of the above described single-site mutations. It was expressed and purified under the same conditions as the wild-type enzyme as described in Example 2. This PHB depolymerase was designated KC1 and has a protein sequence designated SEQ ID NO: 7.

Kinetically, KC1 was found to be similar to the wild-type enzyme, as indicated in Table 4, but was found to be significantly more thermostable (Values in Table 4 are the mean of three independent determinations and values in parentheses are the standard deviation). The calculated pI for KC1 was 5.1 and the molecular weight was 32.6 kDa.

TABLE 4

| $K_m$ (µM) | $k_{cat}$ (s$^{-1}$) | $k_{cat}K_m^{-1}$ (s$^{-1}$µM$^{-1}$) | $pH_{opt}$ | $T_{opt}$ (° C.) |
|---|---|---|---|---|
| 7.4 (0.2) | 3.9 (0.1) | 0.53 | 7.4 | 66.2 (0.2) |

Figure 7:
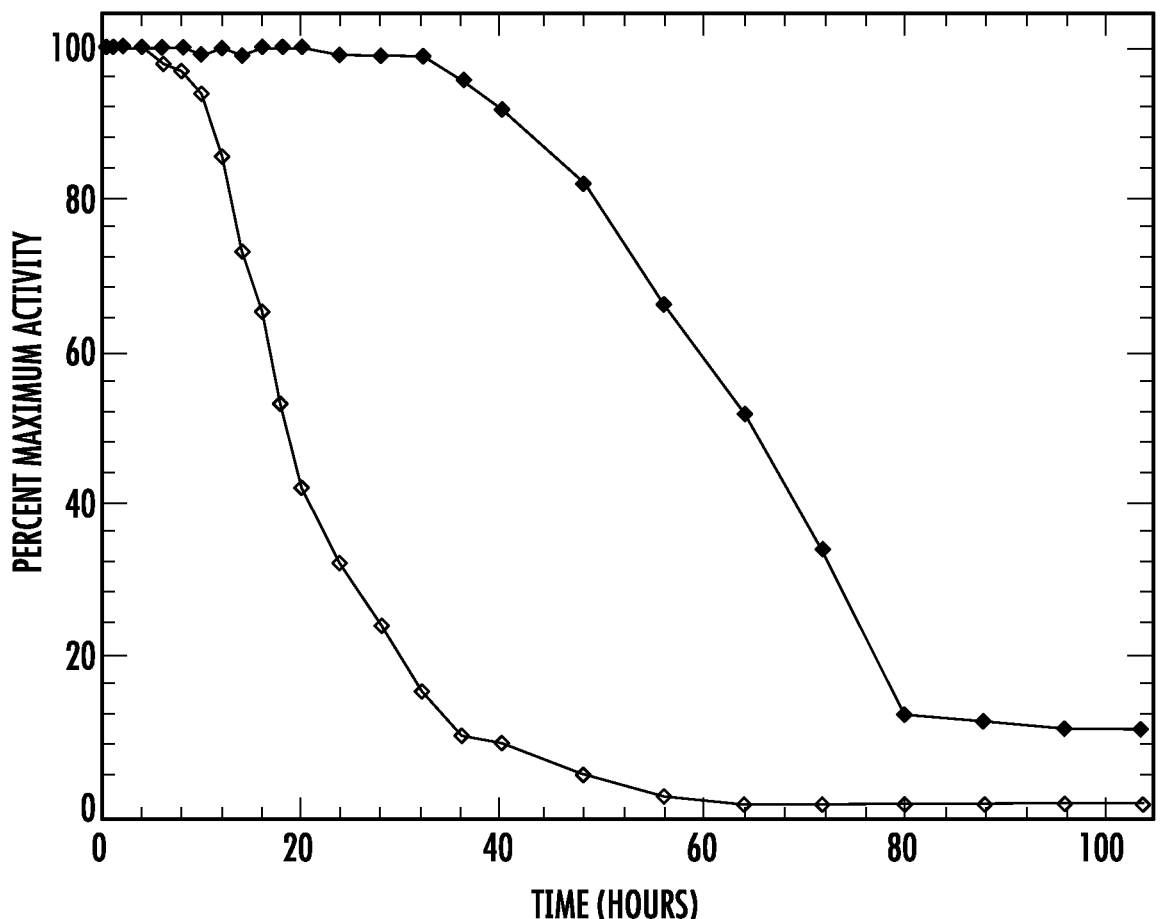
FIG. 7 graphically compares the percent maximum PHBDase enzymatic activity as a function of time at 50° C. for a modified enzyme as described herein and a wild-type PHBDase.

The 1.4-fold increase in kinetic efficiency of KC1 ($K_{cat}K_m^{-1}$) is reflected in both more favorable $K_m$ and $k_{cat}$ values. There was a sizable (12.9° C.) increase in KC1 thermostability relative to the wild-type enzyme (66.2° C. versus 53.3° C.). This means that KC1 is much more useful for high temperature industrial bioprocesses. The increase in stability is also reflected in a longer enzyme activity as a function of time at 50° C. (meaning half-life) as is shown in FIG. 7. On FIG. 7, KC1 values are designated with filled circles and wild-type L. thermophila PHBDase values are designated with open circles. Enzymes were assayed using the turbidometric assay after removing an aliquot from the temperature incubation. Activity at t=0 was arbitrarily set to 100% activity. KC1 was found to have a half-life of 64 hours compared to 18 hours for the wild-type PHBDase. The wild-type enzyme lost all measurable activity by 60 hours, whereas KC1 retained a 12% residual activity to the 104-hour timepoint in this experiment.

Purification yield also varied between the two enzymes. KC-1 typical yield was 34.2 mg/L of induced culture compared to 27.1 mg/L for the wild-type enzyme. This difference was most likely due to changes in overall solubility and to more favorable overall folding.

These results indicate that KC1 can be more economical to use for an industrial bioprocess than is the wild-type enzyme, as more enzyme is produced per liter of culture and an addition of enzyme to the bioprocess lasts longer.

Example 4

The free energy contribution of single amino acids to the overall protein-free energy were calculated (Nandakumar et al., 2017; Cao et al., 2019). The calculation utilized a free energy difference comparison between a single point mutation and the wild-type protein. In this convention, a $\Delta\Delta G>0$ represents a stabilizing mutation. The method employed took advantage of the VMD automutate script which changes any amino acid into any other amino acid in a structure file. The *L. thermophila* model described above was used to create a population of structure files, each with a single amino acid substitution. All 19 natural amino acids were substituted into each position for a total of 5700 structures (300 aa enzyme×19 amino acids). Each structure was energy minimized in implicit solvent via 2 ns of NVT molecular dynamics. The calculations were run on the XSEDE national computing resource BRIDGES utilizing 10 GPUs and 97 hours computation time.

Figure 8:
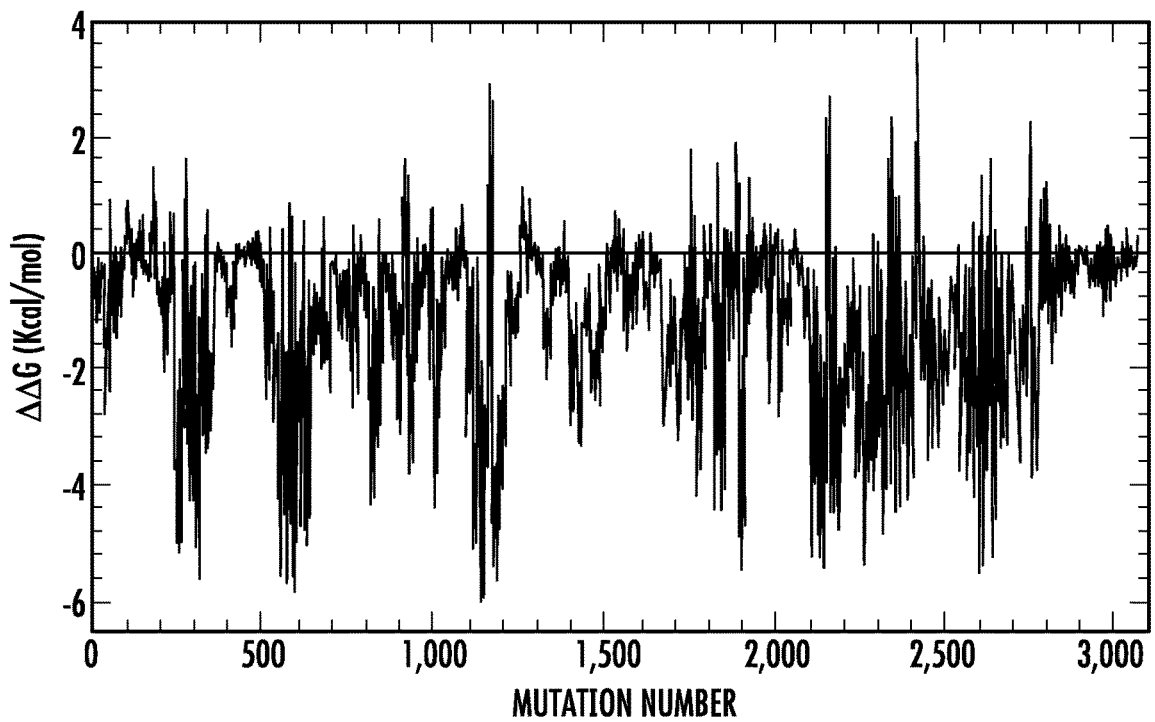
FIG. 8 graphically illustrates Gibbs free energy differences for individual amino acids of a PHBDase upon substitution of different amino acids into each position of a wild-type PHBDase.

Using the standard free energy calculation techniques for molecular dynamics trajectories (Zhang et al., 2012; Aldeghi et al., 2019) a $\Delta G$ value was calculated for each protein mutant. A python script was used to extract the $\Delta G$ values from the output files and to calculate the $\Delta\Delta G$ values. The results are shown graphically in FIG. 8. As expected, most single point mutations were found to be destabilizing (values below the $\Delta\Delta G=0$ line). A much smaller fraction resulted in a more stable protein (values above the $\Delta\Delta G=0$ line). FIG. 8 is arrayed with the first 19 positions (mutation number on the horizontal axis) corresponding to all the possible single point mutants at position one (alanine) of the 300 amino acid protein (SEQ ID NO: 6). The next 19 correspond to position two mutants, etc. Tables 5-13 present the results for 18 positions on SEQ ID NO: 6 that were found to have potential single-site mutations that resulted in a positive $\Delta\Delta G$ value.

TABLE 5

| Position 10 - WT - D | | Position 15 - WT - K | |
|---|---|---|---|
| Mutant | $\Delta\Delta G$ (kcal/mol) | Mutant | $\Delta\Delta G$ (kcal/mol) |
| L | 1.452 | F | 1.654 |
| F | 1.161 | L | 1.151 |
| I | 0.997 | W | 1.013 |
| V | 0.885 | Y | 0.794 |
| M | 0.728 | I | 0.761 |
| T | 0.705 | V | 0.406 |
| W | 0.587 | M | 0.027 |
| G | 0.558 | R | −0.144 |
| N | 0.536 | C | −0.72 |
| S | 0.289 | T | −0.785 |
| H | 0.287 | A | −0.86 |
| Y | 0.206 | S | −0.96 |
| A | 0.194 | H | −0.961 |
| K | 0.19 | Q | −1.33 |
| E | 0.098 | E | −2.123 |
| C | 0.091 | P | −2.726 |
| Q | 0.028 | G | −2.81 |
| R | −0.02 | N | −2.957 |
| P | −0.437 | D | −3.305 |

TABLE 6

| Position 49 - WT - E | | Position 62 - WT - A | |
|---|---|---|---|
| Mutant | $\Delta\Delta G$ (kcal/mol) | Mutant | $\Delta\Delta G$ (kcal/mol) |
| L | 1.62 | L | 2.923 |
| I | 1.406 | W | 2.753 |
| V | 1.348 | Y | 2.343 |
| F | 1.117 | I | 2.144 |
| R | 0.947 | F | 2.099 |
| W | 0.754 | M | 1.453 |
| M | 0.658 | V | 1.334 |
| T | 0.603 | C | 1.142 |
| S | 0.148 | T | −0.044 |
| H | 0.064 | G | −0.898 |
| A | 0.012 | S | −1.107 |
| Q | −0.001 | K | −1.846 |
| K | −0.021 | H | −1.991 |
| N | −0.539 | E | −2.405 |
| Y | −0.67 | P | −2.525 |
| C | −0.708 | N | −2.654 |
| G | −1.094 | R | −2.688 |
| D | −1.184 | Q | −2.708 |
| P | −2.123 | D | −4.222 |

TABLE 7

| Position 93 - WT - S | | Position 97 - WT - V | |
|---|---|---|---|
| Mutant | $\Delta\Delta G$ (kcal/mol) | Mutant | $\Delta\Delta G$ (kcal/mol) |
| I | 1.789 | M | 1.556 |
| L | 1.309 | F | 0.601 |
| F | 0.674 | L | 0.58 |
| W | 0.648 | I | 0.437 |
| M | 0.53 | C | −0.055 |
| Y | 0.263 | W | −0.324 |
| C | 0.11 | A | −0.856 |
| V | −0.291 | S | −1.582 |
| A | −0.477 | T | −1.593 |
| Q | −0.85 | Y | −1.97 |
| T | −0.866 | H | −2.725 |
| H | −1.305 | G | −2.988 |
| N | −1.806 | Q | −3.164 |
| K | −1.872 | P | −3.433 |
| D | −2.02 | E | −3.435 |
| E | −2.154 | K | −3.49 |
| G | −2.207 | R | −3.904 |
| R | −2.547 | N | −4.152 |
| P | −2.905 | D | −4.468 |

TABLE 8

| Position 100 - WT - D | | Position 102 - WT - K | |
|---|---|---|---|
| Mutant | $\Delta\Delta G$ (kcal/mol) | Mutant | $\Delta\Delta G$ (kcal/mol) |
| L | 1.954 | M | 1.361 |
| F | 1.812 | F | 1.287 |
| I | 1.3 | L | 1.101 |
| W | 1.272 | I | 0.752 |
| V | 1.25 | V | 0.692 |
| T | 0.997 | W | 0.517 |
| M | 0.93 | C | 0.334 |
| H | 0.844 | Y | −0.042 |
| Q | 0.825 | Q | −0.068 |
| E | 0.732 | T | −0.147 |
| K | 0.574 | H | −0.185 |
| Y | 0.521 | E | −0.246 |
| A | 0.339 | S | −0.325 |
| N | 0.165 | A | −0.461 |
| S | 0.131 | R | −0.643 |
| R | −0.026 | N | −0.784 |

TABLE 8-continued

| Position 100 - WT - D | | Position 102 - WT - K | |
|---|---|---|---|
| Mutant | ΔΔG (kcal/mol) | Mutant | ΔΔG (kcal/mol) |
| C | −0.068 | D | −1.285 |
| P | −1.027 | P | −1.292 |
| G | −1.52 | G | −1.832 |

TABLE 9

| Position 114 - WT - A | | Position 124 - WT - S | |
|---|---|---|---|
| Mutant | ΔΔG (kcal/mol) | Mutant | ΔΔG (kcal/mol) |
| L | 2.341 | I | 2.391 |
| I | 2.332 | L | 2.319 |
| F | 2.169 | T | 1.669 |
| Y | 1.778 | A | 1.656 |
| V | 1.688 | F | 1.491 |
| M | 1.332 | M | 1.09 |
| C | 0.935 | V | 1.035 |
| T | 0.016 | C | 0.596 |
| S | −0.992 | W | 0.545 |
| P | −1.233 | Y | −2.178 |
| H | −1.685 | G | −2.323 |
| G | −1.741 | K | −2.544 |
| N | −3.732 | N | −2.732 |
| K | −4.009 | R | −2.963 |
| R | −4.381 | D | −3.201 |
| E | −4.418 | E | −3.244 |
| Q | 4.616 | P | −3.41 |
| D | −5.428 | H | −3.898 |
|   |   | Q | −4.029 |

TABLE 10

| Position 128 - WT - G | | Position 139 - WT - G | |
|---|---|---|---|
| Mutant | ΔΔG (kcal/mol) | Mutant | ΔΔG (kcal/mol) |
| L | 3.793 | W | 1.691 |
| F | 2.969 | F | 1.292 |
| I | 2.841 | Y | 1.13 |
| W | 2.742 | L | 0.377 |
| A | 1.963 | I | 0.158 |
| M | 1.771 | C | −0.247 |
| V | 1.747 | V | −0.266 |
| E | 1.555 | T | −0.699 |
| T | 1.331 | M | −0.766 |
| C | 1.291 | A | −1.163 |
| Y | 1.069 | H | −1.564 |
| N | 1.001 | S | −1.58 |
| Q | 0.493 | K | −2.151 |
| P | 0.138 | R | −2.716 |
| S | 0.037 | N | −2.892 |
| H | −0.04 | P | −3.105 |
| K | −0.405 | E | −3.181 |
| D | −0.646 | Q | −3.414 |
| R | −0.989 | D | −3.889 |

TABLE 11

| Position 145 - WT - E | | Position 148 - WT - A | |
|---|---|---|---|
| Mutant | ΔΔG (kcal/mol) | Mutant | ΔΔG (kcal/mol) |
| P | 2.364 | L | 1.288 |
| L | 0.735 | C | 1.128 |
| V | 0.661 | F | 1.058 |
| F | 0.553 | W | 0.564 |
| H | 0.271 | I | 0.548 |
| W | 0.221 | M | 0.381 |
| T | 0.137 | Y | 0.309 |
| K | 0.001 | V | 0.168 |
| I | −0.247 | T | −0.445 |
| M | −0.497 | N | −0.465 |
| A | −0.628 | S | −0.49 |
| S | −0.903 | K | −0.551 |
| Q | −1.035 | E | −0.632 |
| C | −1.104 | G | −0.891 |
| Y | −1.154 | Q | −0.926 |
| R | −1.259 | D | −0.975 |
| N | −1.438 | R | −1.01 |
| D | −2.076 | H | −1.158 |
| G | −2.527 |   |   |

TABLE 12

| Position 169 - WT - Q | | Position 202 - WT - G | |
|---|---|---|---|
| Mutant | ΔΔG (kcal/mol) | Mutant | ΔΔG (kcal/mol) |
| L | 2.169 | L | 3 |
| W | 1.251 | F | 2.278 |
| I | 1.027 | I | 2.166 |
| F | 0.74 | V | 1.385 |
| M | 0.683 | M | 1.175 |
| V | 0.641 | W | 1.046 |
| T | 0.489 | A | 0.717 |
| S | −0.213 | T | 0.66 |
| A | −0.27 | Y | 0.357 |
| C | −0.369 | Q | −0.029 |
| K | −0.462 | C | −0.134 |
| H | −0.564 | S | −0.448 |
| N | −0.713 | H | −0.506 |
| E | −0.745 | N | −0.788 |
| R | −0.757 | E | −0.851 |
| Y | −0.813 | K | −1.323 |
| D | −1.19 | R | −1.427 |
| P | −1.676 | P | −1.834 |
| G | −1.969 | D | −2.349 |

TABLE 13

| Position 259 - WT - K | | Position 260 - WT - I | |
|---|---|---|---|
| Mutant | ΔΔG (kcal/mol) | Mutant | ΔΔG (kcal/mol) |
| L | 1.249 | W | 1.394 |
| F | 0.932 | Y | 0.94 |
| H | 0.878 | F | 0.503 |
| I | 0.657 | L | 0.35 |
| V | 0.485 | C | −0.447 |
| Y | 0.42 | V | −0.564 |
| W | 0.051 | M | −0.697 |
| G | 0.037 | T | −2.155 |
| S | −0.056 | H | −2.288 |
| T | −0.277 | K | −2.319 |
| Q | −0.4 | A | −2.453 |
| M | −0.437 | N | −3.266 |
| A | −0.448 | R | −3.47 |
| E | −0.867 | G | −3.55 |
| C | −0.952 | S | −3.613 |
| R | −1.165 | Q | −4.625 |
| N | −2.042 | D | −4.772 |
| D | −3.065 | E | −4.858 |
| P | −4.695 | P | −4.996 |

As shown, not all of the possible 19 amino acid substitutions for any one position were stabilizing. Of interest, the mutation that was shown to be most stabilizing for position 93 (Table 6) in the analysis of Example 3 (S93I) was also found to be the most stabilizing in this approach. Of the 299 amino acids in the mature enzyme, there were 14 positions which were calculated to produce an enzyme that is more stable than the WT protein with calculated ΔΔG values≥1.5 kcal/mol (the relationship that $\Delta\Delta G = \Delta G_{WT} - \Delta G_{MUT}$ was employed, so that values>0 were defined as potentially stabilizing). There were an additional 5 positions where the calculated ΔΔG value was between 1.2 and 1.49 kcal/mol. By definition, any ΔΔG>0 has the potential to be stabilizing, but as the calculated ΔΔG value drops below 1.0 and approaches 0.0, there is less benefit in employing that mutation in a stabilization effort. Thus only 4.7% of all positions were found to be potentially strongly stabilizing with an additional 1.7% of positions are in the second tier of potentially stabilizing positions.

Example 5

The 3D model developed as described previously was visually inspected using the computer program VMD to identify areas of poor packing. Voids within the interior of the protein or surface divots were identified that could be better filled with a bulkier or more hydrophilic sidechain. Twenty-nine possible positions were identified (Table 14) as potential mutation sites. The VMD MUTATE tool was used to place each of the other 19 amino acids into each position and the best fitting one was selected (the criteria being best fit into the volume, meaning most of the void now occupied with the fewest clashes). The best fitting rotomer of the selected amino acid was used to calculate a single point energy calculation ($\Delta G_{mut}$) using the NAMDEnergy tool in VMD. The ΔΔG was calculated as $\Delta G_{wt} - \Delta G_{mut}$ and a list of stabilizing mutations as shown in Table 14 was obtained.

TABLE 14

| Mutation | ΔΔG (kcal/mol) |
|---|---|
| F3V | 5.14 |
| M33V | 5.78 |
| P41W | 4.15 |
| F44I | 2.53 |
| M50L | 5.08 |
| W78L | 4.03 |
| P91L | 2.03 |
| A92P | 2.16 |
| A114V | 3.24 |
| A122I | 2.10 |
| M123L | 6.67 |
| M127L | 3.49 |
| A129L | 2.78 |
| F135L | 3.68 |
| L144W | 5.41 |
| M152W | 3.85 |
| M157L | 3.48 |
| M159L | 3.65 |
| I160G | 5.50 |
| V167P | 3.23 |
| V184P | 4.85 |
| F189W | 5.17 |
| V200P | 2.64 |
| I206L | 2.16 |

TABLE 14-continued

| Mutation | ΔΔG (kcal/mol) |
|---|---|
| W209I | 3.42 |
| M233I | 6.13 |
| M261L | 3.59 |
| W269V | 2.00 |
| A275G | 2.54 |

An enzyme including all of the mutations of Table 14 was formed and was designated KC2 (SEQ ID NO: 8). The KC2 construct was produced and the enzyme was expressed and purified as described above in Example 2.

Figure 9:
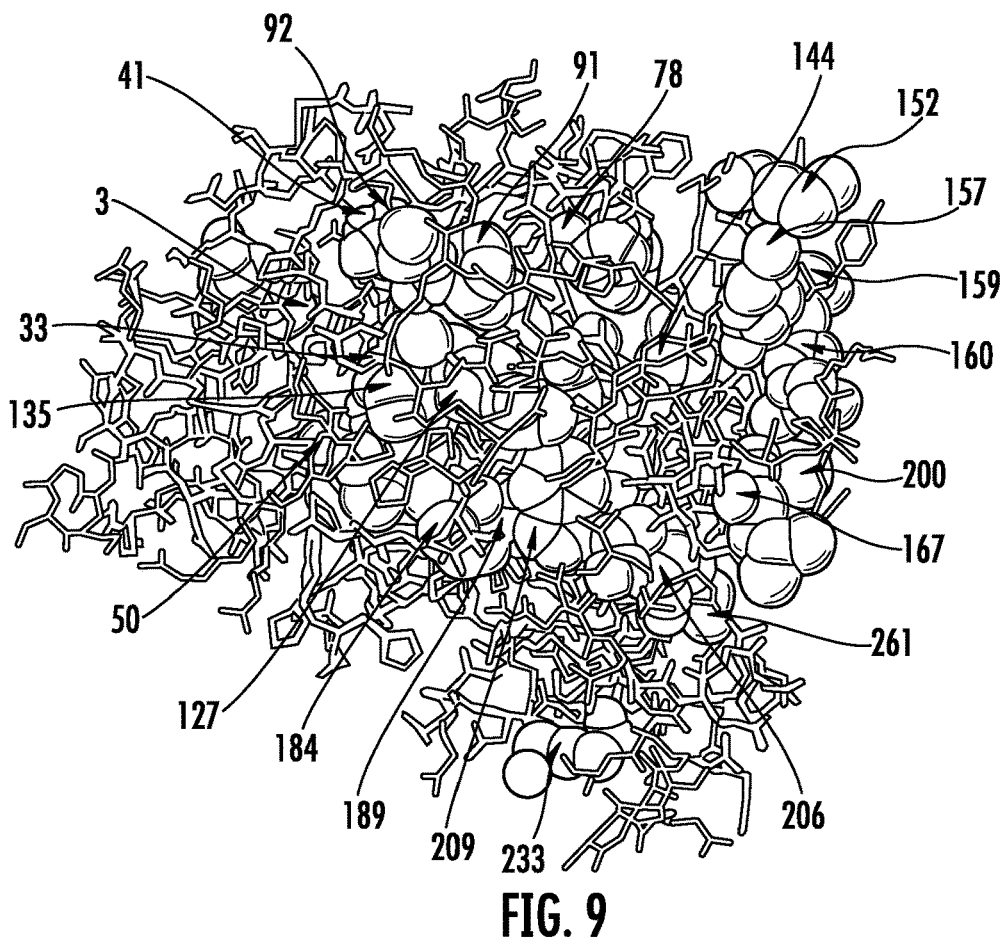
FIG. 9 provides a first view of a molecular model of a modified PHBDase showing the position of a portion of 29 single-site mutations to an *L. thermophila* wild-type PHBDase.
Figure 10:
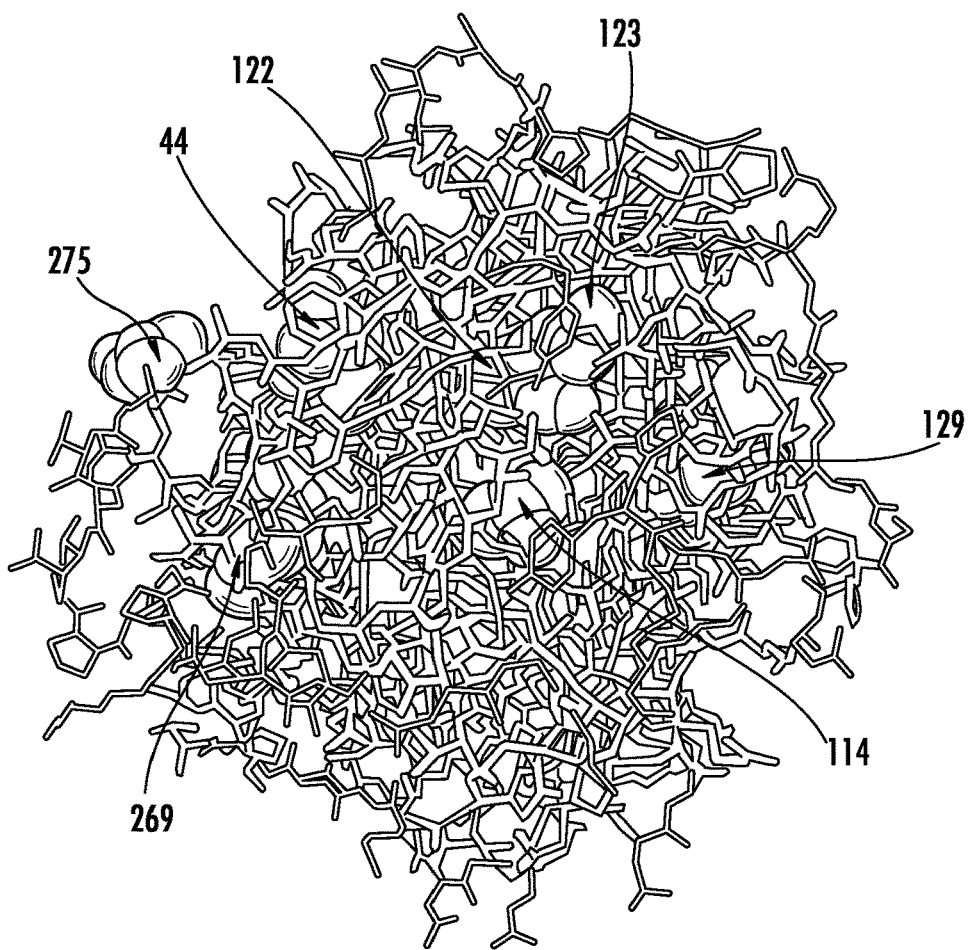
FIG. 10 provides a second view of the molecular model of the modified PHBDase of FIG. 9 showing the position of another portion of the 29 single-site mutations to the *L. thermophila* wild-type PHBDase.

The mutations of KC2 are visualized in the protein 3D model in FIG. 9 and FIG. 10, with the two views of FIG. 9 and FIG. 10 rotated approximately 180° in the x-axis to show all of the mutation sites.

The KC2 enzyme was assayed for activity and the results are shown in Table 15, below. Values in Table 15 are the mean of three independent determinations. Values in parentheses are the standard deviation.

TABLE 15

| $K_m$ (µM) | $k_{cat}$ (s$^{-1}$) | $k_{cat}K_m^{-1}$ (s$^{-1}$µM$^{-1}$) | pH$_{opt}$ | T$_{opt}$ (° C.) |
|---|---|---|---|---|
| 8.4 (0.2) | 3.4 (0.2) | 0.41 | 7.4 | 64.2 (0.2) |

Overall, KC2 fell between the wild-type enzyme and KC1 in terms of stability and kinetic parameters. It exhibits an overall improvement over the wild-type enzyme. The calculated pI of KC2 was 5.4 and the molecular weight was 32.0 kDa.

Figure 11:
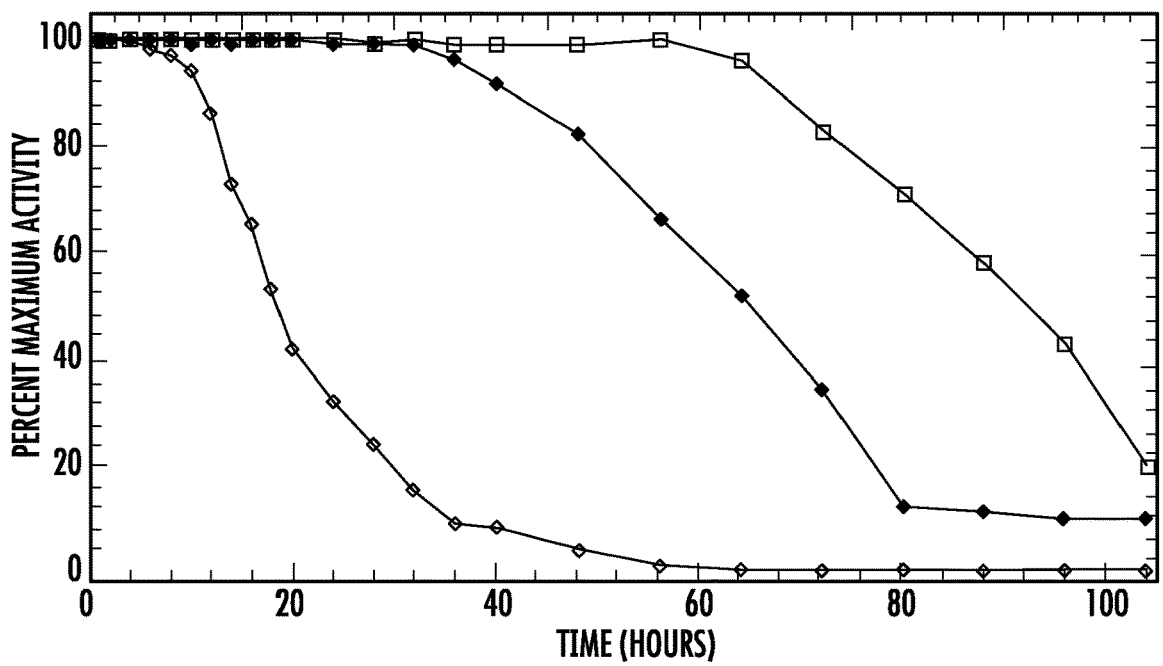
FIG. 11 graphically compares the percent maximum PHBDase enzymatic activity as a function of time at 50° C. for two modified enzymes as described herein and a wild-type PHBDase.

A component of KC2 that makes it well suited for the industrial bioprocess of PHB depolymerization is the observation that it is significantly longer lived in a reaction at 50° C. than either the wild-type enzyme or the KC1 variant. KC2 has a half-life of approximately 86 hours (FIG. 11), which is 22 hours more than KC1 and 68 hours more than the wild-type enzyme. In FIG. 11, KC2 values are indicated with open squares, KC1 values are indicated with filled circles, and wild-type L. thermophila PHBDase values are indicated with open circles. Data for KC1 and wild-type enzyme is identical to that of FIG. 6. Enzymes were assayed using the turbidometric assay after removing an aliquot from the temperature incubation. Activity at t=0 was arbitrarily set to 100% activity.

As shown, for an already moderately thermophilic enzyme, alterations to thermodynamic stability through selected mutation may be important in engineering an improved industrial enzyme in conjunction with modifications to enzyme denaturation temperature.

While certain embodiments of the disclosed subject matter have been described using specific terms, such description is for illustrative purposes only, and it is to be understood that changes and variations may be made without departing from the spirit or scope of the subject matter.

What is claimed:

1. A method for treatment of a post-consumer product, the method comprising:
contacting a post-consumer product with a polypeptide, the post-consumer product comprising a polyhydroxyalkanoate, the polypeptide catalyzing degradation of the polyhydroxyalkanoate, the contacting taking place at a temperature ef from 45° C. to 90° C.;
wherein the polypeptide comprises a modified polyhydroxyalkanoate depolymerase comprising the amino acid sequence of SEQ ID NO: 6 with the exception of at least one mutation at one or more position corresponding to position 3, 10, 15, 33, 41, 44, 49, 50, 62, 67, 78, 91, 92, 93, 97, 100, 102, 114, 122, 123, 124, 125, 127, 128, 129, 135, 139, 144, 145, 148, 152, 157, 159, 160, 167, 169, 184, 189, 200, 202, 206, 209, 233, 259, 260, 261, 269, and/or 275 of the amino acid sequence of SEQ ID NO: 6, wherein each mutation of the modified polyhydroxyalkanoate depolymerase independently has a DDG value of 1 kcal/mol or greater.

2. The method of claim 1, wherein the contacting takes place at a temperature of from 50° C. to 85° C. or from 55° C. to 80° C.

3. The method of claim 1, the post-consumer product comprises a post-consumer personal care product.

4. The method of claim 3, wherein prior to the contacting, the post-consumer personal care product is contaminated with a bodily waste, wherein the bodily waste comprises at least one of blood, urine, feces, or menstrual fluid.

5. The method of claim 1, wherein each mutation of the modified polyhydroxyalkanoate depolymerase independently has a DDG value of 1.5 kcal/mol or greater, or 2 kcal/mol or greater, or wherein all mutations of the polypeptide have a DDG value of 1 kcal/mol or greater, 1.5 kcal/mol or greater, or 2 kcal/mol or greater.

6. The method of claim 1, wherein the modified polyhydroxybutyrate depolymerase comprises an optimum temperature of 50° C. or greater, 55° C. or greater, or 60° C. or greater and/or comprising a specificity of 35 $s^{-1}$ $mM^{-1}$ or higher, 0.40 $s^{-1}$ $mM^{-1}$ or higher, 0.45 $s^{-1}$ $mM^{-1}$ or higher, or 0.5 $s^{-1}$ $mM^{-1}$.

* * * * *